United States Patent
Stitt et al.

(10) Patent No.: US 11,089,433 B2
(45) Date of Patent: *Aug. 10, 2021

(54) SYSTEM AND METHOD FOR ESTABLISHING REAL-TIME LOCATION

(71) Applicant: DENSO CORPORATION, Kariya (JP)

(72) Inventors: Raymond Michael Stitt, Ada, MI (US); Eric Smith, Holland, MI (US); Michael Stroud, Grand Haven, MI (US); Robert Hartman, Holland, MI (US); Karl Jager, Zeeland, MI (US); Antonio Fominaya, IV, Belmont, MI (US)

(73) Assignee: DENSO CORPORATION, Kariya (JP)

(*) Notice: Subject to any disclaimer, the term of this patent is extended or adjusted under 35 U.S.C. 154(b) by 94 days.

This patent is subject to a terminal disclaimer.

(21) Appl. No.: 16/832,774

(22) Filed: Mar. 27, 2020

(65) Prior Publication Data

US 2020/0228919 A1    Jul. 16, 2020

Related U.S. Application Data

(63) Continuation of application No. 15/627,496, filed on Jun. 20, 2017, now Pat. No. 10,616,710, which is a
(Continued)

(51) Int. Cl.
*H04W 4/021* (2018.01)
*H04W 4/029* (2018.01)
(Continued)

(52) U.S. Cl.
CPC .............. *H04W 4/021* (2013.01); *G01S 5/02* (2013.01); *G06F 21/31* (2013.01); *G06F 21/35* (2013.01);
(Continued)

(58) Field of Classification Search
CPC ....... H04W 4/02; H04W 64/00; H04W 4/023; H04W 4/025; H04L 63/0823; H04L 2209/80
See application file for complete search history.

(56) References Cited

U.S. PATENT DOCUMENTS 6,069,411 A    5/2000 Charron
6,211,776 B1    4/2001 Röhrl et al.
(Continued)

FOREIGN PATENT DOCUMENTS

JP    2014-136894    7/2014
JP    2015-190774    11/2015
(Continued)

OTHER PUBLICATIONS

Dahlgren, Erik et al., "Evaluation of indoor positioning based on Bluetooth Smart technology", Chalmers University of Technology, Department of Computer Science and Engineering, Jun. 10, 2014, pp. 1-94.
(Continued)

*Primary Examiner* — Margaret G Mastrodonato
(74) *Attorney, Agent, or Firm* — Warner Norcross + Judd LLP

(57) ABSTRACT

A communication system with a master device configured to determine location information in real-time with respect to a portable device. The master device may direct one or more monitor devices to monitor communications that occur over a primary communication link. The monitor devices may sense characteristic information about the signal from the portable device, and communicate this characteristic information to the master device via an auxiliary communication link. The communication system may determine location of the portable device, authenticate the portable device, determine whether the portable device is authorized to allow or
(Continued)

initiate an action, and command or enable an action with respect to equipment.

33 Claims, 6 Drawing Sheets

Related U.S. Application Data continuation of application No. 15/488,136, filed on Apr. 14, 2017, now Pat. No. 9,794,753.

(60) Provisional application No. 62/323,262, filed on Apr. 15, 2016.

(51) Int. Cl.

| | |
|---|---|
| *H04W 4/40* | (2018.01) |
| *G01S 5/02* | (2010.01) |
| *H04B 17/27* | (2015.01) |
| *H04L 9/32* | (2006.01) |
| *G06F 21/35* | (2013.01) |
| *G07C 9/00* | (2020.01) |
| *H04W 4/02* | (2018.01) |
| *H04W 12/06* | (2021.01) |
| *H04W 12/069* | (2021.01) |
| *H04B 17/318* | (2015.01) |
| *H04W 76/15* | (2018.01) |
| *H04W 4/80* | (2018.01) |
| *G06F 21/31* | (2013.01) |
| *H04W 4/33* | (2018.01) |
| *G07C 9/28* | (2020.01) |
| *H04W 24/08* | (2009.01) |
| *H04W 84/18* | (2009.01) |
| *H04L 29/06* | (2006.01) |

(52) U.S. Cl.
CPC ......... *G07C 9/00309* (2013.01); *H04B 17/27* (2015.01); *H04B 17/318* (2015.01); *H04L 9/3226* (2013.01); *H04W 4/023* (2013.01); *H04W 4/029* (2018.02); *H04W 4/40* (2018.02); *H04W 4/80* (2018.02); *H04W 12/06* (2013.01); *H04W 12/069* (2021.01); *H04W 76/15* (2018.02); *G06F 2221/2111* (2013.01); *G07C 9/28* (2020.01); *H04L 63/0823* (2013.01); *H04L 2209/80* (2013.01); *H04L 2209/84* (2013.01); *H04W 4/33* (2018.02); *H04W 24/08* (2013.01); *H04W 84/18* (2013.01)

(56) References Cited

U.S. PATENT DOCUMENTS

| | | |
|---|---|---|
| 6,218,932 B1 | 4/2001 | Stippler |
| 6,259,168 B1 | 7/2001 | Okada |
| 6,522,027 B1 | 2/2003 | Morillon et al. |
| 6,556,135 B2 | 4/2003 | Attring et al. |
| 6,697,024 B2 | 2/2004 | Fuerst et al. |
| 6,906,612 B2 | 6/2005 | Ghabra et al. |
| 6,965,295 B2 | 11/2005 | Shimonomoto et al. |
| 6,980,124 B2 | 12/2005 | Kong et al. |
| 7,046,119 B2 | 5/2006 | Ghabra et al. |
| 7,089,035 B2 | 8/2006 | Ando et al. |
| 7,106,171 B1 | 9/2006 | Burgess |
| 7,170,998 B2 | 1/2007 | McLintock et al. |
| 7,224,980 B2 | 5/2007 | Hara |
| 7,228,122 B2 | 6/2007 | Oyagi et al. |
| 7,277,007 B2 | 10/2007 | John et al. |
| 7,280,097 B2 | 10/2007 | Chen et al. |
| 7,321,814 B2 | 1/2008 | Kanda et al. |
| 7,333,021 B2 | 2/2008 | Ieda et al. |
| 7,394,349 B2 | 7/2008 | Marek et al. |
| 7,446,644 B2 | 11/2008 | Schaffzin et al. |
| 7,530,113 B2 | 5/2009 | Braun |
| 7,548,491 B2 | 6/2009 | Macfarlane |
| 7,629,873 B2 | 12/2009 | Ghabra et al. |
| 7,663,502 B2 | 2/2010 | Breed |
| 7,710,245 B2 | 5/2010 | Pickering |
| 7,751,957 B2 | 7/2010 | Nagaoka et al. |
| 7,757,076 B2 * | 7/2010 | Stewart ............... H04L 67/125 713/156 |
| 7,768,377 B2 | 8/2010 | Brey |
| 7,805,169 B2 | 9/2010 | Hicks, III |
| 7,850,078 B2 | 12/2010 | Christenson et al. |
| 7,868,745 B2 | 1/2011 | Schmidt et al. |
| 7,904,219 B1 | 3/2011 | Lowrey et al. |
| 7,911,358 B2 | 3/2011 | Bos et al. |
| 7,912,625 B2 | 3/2011 | Cahoon |
| 7,916,021 B2 | 3/2011 | Lickfelt et al. |
| 7,932,892 B2 | 4/2011 | Chen et al. |
| 7,961,076 B2 | 6/2011 | Kelley et al. |
| 7,999,655 B2 | 8/2011 | Yoshikawa |
| 8,022,808 B2 | 9/2011 | Kurpinski et al. |
| 8,048,174 B2 | 11/2011 | Yamamichi et al. |
| 8,050,817 B2 | 11/2011 | Moinzadeh et al. |
| 8,053,922 B2 | 11/2011 | Müller |
| 8,077,011 B2 | 12/2011 | McBride et al. |
| 8,089,339 B2 | 1/2012 | Mikan et al. |
| 8,089,342 B2 | 1/2012 | Sugiura et al. |
| 8,098,130 B2 | 1/2012 | Baruco et al. |
| 8,102,239 B2 | 1/2012 | Woo |
| 8,115,609 B2 | 2/2012 | Ketari |
| 8,126,400 B2 | 2/2012 | Jung et al. |
| 8,126,450 B2 | 2/2012 | Howarter et al. |
| 8,127,984 B2 | 3/2012 | Zatloukal et al. |
| 8,159,324 B2 | 4/2012 | Zellweger et al. |
| 8,175,613 B2 | 5/2012 | Patil et al. |
| 8,175,657 B2 | 5/2012 | Okayasu |
| 8,193,903 B2 | 6/2012 | Kraimer et al. |
| 8,224,313 B2 | 7/2012 | Howarter et al. |
| 8,245,052 B2 | 8/2012 | Bjorn |
| 8,248,968 B2 | 8/2012 | Handforth et al. |
| 8,284,022 B2 | 10/2012 | Kachouh |
| 8,299,895 B2 | 10/2012 | Harris |
| 8,319,605 B2 | 11/2012 | Hassan et al. |
| 8,334,758 B2 | 12/2012 | Baruco et al. |
| 8,358,197 B2 | 1/2013 | Tran |
| 8,421,589 B2 | 4/2013 | Sultan et al. |
| 8,427,289 B2 | 4/2013 | Ghabra et al. |
| 8,432,260 B2 | 4/2013 | Talty et al. |
| 8,437,886 B1 | 5/2013 | Yang |
| 8,437,916 B2 | 5/2013 | Fawaz et al. |
| 8,482,382 B2 | 7/2013 | Lickfelt et al. |
| 8,494,447 B2 | 7/2013 | Oesterling et al. |
| 8,527,015 B2 | 9/2013 | Alrabady et al. |
| 8,610,674 B2 | 12/2013 | Pryor |
| 8,706,143 B1 | 4/2014 | Elias |
| 8,744,482 B2 | 6/2014 | Margalef et al. |
| 8,868,254 B2 | 10/2014 | Louboutin |
| 8,947,202 B2 | 2/2015 | Tucker et al. |
| 9,241,235 B2 | 1/2016 | Santavicca |
| 9,536,364 B2 | 1/2017 | Talty et al. |
| 9,794,753 B1 | 10/2017 | Stitt et al. |
| 2001/0054952 A1 | 12/2001 | Desai et al. |
| 2002/0140545 A1 | 10/2002 | Nietupski et al. |
| 2002/0186144 A1 | 12/2002 | Meunier |
| 2003/0117293 A1 | 6/2003 | Tang et al. |
| 2003/0135321 A1 | 7/2003 | Kumazaki et al. |
| 2004/0201277 A1 | 10/2004 | Hentsch et al. |
| 2004/0257209 A1 | 12/2004 | Yang |
| 2005/0038574 A1 | 2/2005 | Gila et al. |
| 2005/0046554 A1 | 3/2005 | Attaprasith |
| 2005/0099263 A1 | 5/2005 | Ikeda |
| 2005/0225429 A1 | 10/2005 | Burzio |
| 2005/0242923 A1 | 11/2005 | Pearson et al. |
| 2006/0061459 A1 | 3/2006 | Kawamura et al. |
| 2006/0135216 A1 | 6/2006 | Collavo et al. |
| 2006/0164207 A1 | 7/2006 | Wilcox |
| 2006/0238297 A1 | 10/2006 | Tang et al. |
| 2007/0109093 A1 | 5/2007 | Matsubara et al. |

(56) References Cited

U.S. PATENT DOCUMENTS

| | | |
|---|---|---|
| 2007/0142155 A1 | 6/2007 | Schumacher |
| 2007/0176739 A1 | 8/2007 | Raheman |
| 2007/0197261 A1 | 8/2007 | Humbel |
| 2007/0281735 A1 | 12/2007 | Suzuki |
| 2008/0068128 A1 | 3/2008 | Ghabra et al. |
| 2008/0136611 A1 | 6/2008 | Benco et al. |
| 2008/0143499 A1 | 6/2008 | Shimomura |
| 2008/0147268 A1 | 6/2008 | Fuller |
| 2008/0194291 A1 | 8/2008 | Martin et al. |
| 2008/0197970 A1 | 8/2008 | Fouts |
| 2008/0197987 A1 | 8/2008 | King et al. |
| 2008/0266174 A1 | 10/2008 | Medina Herrero |
| 2008/0309453 A1 | 12/2008 | Kim et al. |
| 2009/0115585 A1 | 5/2009 | Minassian |
| 2009/0146830 A1 | 6/2009 | Ogiso |
| 2009/0156126 A1 | 6/2009 | Willis |
| 2009/0167524 A1 | 7/2009 | Chestnutt et al. |
| 2009/0195370 A1 | 8/2009 | Huffman et al. |
| 2009/0212905 A1 | 8/2009 | Batz et al. |
| 2009/0286548 A1 | 11/2009 | Coronel et al. |
| 2009/0289780 A1 | 11/2009 | Tenorio-Fox |
| 2009/0291637 A1 | 11/2009 | Alrabady et al. |
| 2009/0328189 A1 | 12/2009 | Budyta et al. |
| 2010/0017118 A1 | 1/2010 | Dougherty |
| 2010/0026578 A1 | 2/2010 | Furnanz et al. |
| 2010/0063670 A1 | 3/2010 | Brzezinski et al. |
| 2010/0087137 A1 | 4/2010 | Fischer et al. |
| 2010/0097178 A1 | 4/2010 | Pisz et al. |
| 2010/0102924 A1 | 4/2010 | King et al. |
| 2010/0109914 A1 | 5/2010 | Tieman et al. |
| 2010/0128637 A1 | 5/2010 | Aggarwal et al. |
| 2010/0135178 A1 | 6/2010 | Aggarwal et al. |
| 2010/0136944 A1 | 6/2010 | Taylor et al. |
| 2010/0185537 A1 | 7/2010 | Bari |
| 2010/0222940 A1 | 9/2010 | Pütsch |
| 2010/0265034 A1 | 10/2010 | Cap et al. |
| 2011/0045842 A1 | 2/2011 | Rork et al. |
| 2011/0060480 A1 | 3/2011 | Mottla et al. |
| 2011/0086668 A1 | 4/2011 | Patel |
| 2011/0112969 A1 | 5/2011 | Zaid et al. |
| 2011/0165896 A1 | 7/2011 | Stromberg et al. |
| 2011/0169604 A1 | 7/2011 | Ghabra et al. |
| 2011/0215901 A1 | 9/2011 | Van Wiemeersch et al. |
| 2011/0275321 A1 | 11/2011 | Zhou et al. |
| 2012/0105197 A1 | 5/2012 | Kobres |
| 2012/0126943 A1 | 5/2012 | Biondo et al. |
| 2012/0129493 A1 | 5/2012 | Vasudevan |
| 2012/0164989 A1 | 6/2012 | Xiao et al. |
| 2012/0208519 A1 | 8/2012 | Seaver |
| 2012/0229253 A1 | 9/2012 | Kolar |
| 2012/0244875 A1 | 9/2012 | Cardona et al. |
| 2012/0268259 A1 | 10/2012 | Igel et al. |
| 2012/0281565 A1 | 11/2012 | Sauer |
| 2012/0282913 A1 | 11/2012 | Kaindl et al. |
| 2012/0309314 A1 | 12/2012 | Chen et al. |
| 2012/0310446 A1 | 12/2012 | Murphy |
| 2012/0313768 A1 | 12/2012 | Campbell et al. |
| 2012/0313796 A1 | 12/2012 | Lee et al. |
| 2012/0329445 A1 | 12/2012 | Elliott |
| 2013/0015814 A1 | 1/2013 | Kelty et al. |
| 2013/0082820 A1 | 4/2013 | Tieman |
| 2013/0099892 A1 | 4/2013 | Tucker et al. |
| 2013/0103200 A1 | 4/2013 | Tucker et al. |
| 2013/0106602 A1 | 5/2013 | Lickfelt |
| 2013/0109342 A1 | 5/2013 | Welch |
| 2013/0130674 A1 | 5/2013 | De Wind et al. |
| 2013/0141212 A1 | 6/2013 | Pickering |
| 2013/0154819 A1 | 6/2013 | Stefanovski et al. |
| 2013/0194068 A1 | 8/2013 | Mönig et al. |
| 2013/0211623 A1 | 8/2013 | Thompson et al. |
| 2013/0237189 A1 | 9/2013 | Nishidai |
| 2013/0257604 A1 | 10/2013 | Mirle et al. |
| 2013/0259232 A1 | 10/2013 | Petel |
| 2013/0271273 A1 | 10/2013 | Oesterling |
| 2013/0332007 A1 | 12/2013 | Louboutin |
| 2013/0344892 A1 | 12/2013 | Lymberopoulos et al. |
| 2014/0025950 A1 | 1/2014 | Peeters et al. |
| 2014/0169564 A1 | 6/2014 | Gautama et al. |
| 2014/0188309 A1 | 7/2014 | Caratto et al. |
| 2014/0188348 A1 | 7/2014 | Gautama et al. |
| 2014/0308971 A1 | 10/2014 | O'Brien et al. |
| 2014/0334370 A1* | 11/2014 | Tan .................. H04W 52/0235 370/311 |
| 2015/0050923 A1 | 2/2015 | Tu et al. |
| 2015/0105944 A1 | 4/2015 | Louboutin |
| 2015/0147974 A1 | 5/2015 | Tucker et al. |
| 2015/0235486 A1 | 8/2015 | Ellis et al. |
| 2015/0287257 A1 | 10/2015 | Thompson |
| 2015/0327022 A1 | 11/2015 | Lin et al. |
| 2015/0329081 A1 | 11/2015 | Morita |
| 2015/0334534 A1 | 11/2015 | Babu et al. |
| 2015/0373482 A1 | 12/2015 | Barnard et al. |
| 2016/0360018 A1* | 12/2016 | Watson ............... H04M 1/6066 |
| 2017/0126284 A1 | 5/2017 | Assem et al. |
| 2017/0234962 A1 | 8/2017 | Yang et al. |
| 2017/0303080 A1 | 10/2017 | Stitt et al. |
| 2019/0104493 A1 | 4/2019 | Hedley et al. |

FOREIGN PATENT DOCUMENTS

| | | |
|---|---|---|
| WO | 2010/059934 | 5/2010 |
| WO | 2016/023901 | 2/2016 |

OTHER PUBLICATIONS

Faragher, R. et al., "An Analysis of the Accuracy of Bluetooth Low Energy for Indoor Positioning Applications", Proceedings of the 27th International Technical Meeting of The Satellite Division of the Institute of Navigation (ION GNSS+ 2014), Tampa, Florida, Sep. 2014, pp. 201-210.

Faragher, R., et al., "Location Fingerprinting With Bluetooth Low Energy Beacons", IEEE Journal on Selected Areas in Communications, vol. 33, No. 11 Nov. 2015, pp. 2418-2428.

Hereman, Willy et al., "Determination of a Position in Three Dimensions Using Trilateration and Approximate Distances", Department of Mathematical and Computer Sciences, Colorado School of Mines, Sep. 17, 1995, submitted to Decision Sciences, Oct. 1995, pp. 1-22.

Ryan, Mike, "Bluetooth: With Low Energy comes Low Security", iSEC Partners, presented at Proceedings of the 7th USENIX conference on Offensive Technologies, Aug. 13, 2013, pp. 1-7.

Halder, S.J. et al., "Advanced Smoothing Approach of RSSI and LQI for Indoor Localization System", International Journal of Distributed Sensor Networks, accepted Nov. 3, 2014, pp. 1-13.

Lindh, J., "Bluetooth Low Energy Beacons", Texas Instruments Corporation Application Report, Jan. 2015, pp. 1-13.

"Real-time locating system", available at https://en.wikipedia.org/wiki/Real-time_locating_system as of Feb. 6, 2014.

http://www.onyxbeacon.com/ available as of Jun. 25, 2014.

http://developer.estimote.com/ available as of Aug. 13, 2015.

https://getpixie.com available as of Aug. 23, 2014.

http://www.slideshare.net/localzco/whats-bestmicrolocationtechnologyibeaconblenfcqrgps available as of Apr. 5, 2014.

Invitation to Pay Additional Fees for International Application PCT/US2017/027686 mailed Jun. 7, 2017.

International Search Report and the Written Opinion of the International Searching Authority for International Application No. PCT/US2017/027686 dated Aug. 14, 2017.

\* cited by examiner

SYSTEM AND METHOD FOR ESTABLISHING REAL-TIME LOCATION

TECHNICAL FIELD

The present application relates to systems and methods for establishing real-time location information with respect to a portable device, and more specifically for establishing location information of the portable device by monitoring radio frequency communications.

BACKGROUND

Real-time location or position determinations for objects have become increasingly beneficial across a wide spectrum of applications. Real-time locating systems (RTLS) are used and relied on for tracking objects, such as portable devices, in many realms including, for example, automotive, storage, retail, security access for authentication, and security access for authorization.

One conventional RTLS system in the automotive realm includes a transceiver or master controller located within a vehicle and capable of communicating via radio frequency with a portable device. The master controller may monitor the signal strength of the communications between itself and the portable device, and use this monitored information as a basis for determining a location of the portable device relative to the vehicle. This type of RTLS system, however, is often inaccurate, primarily because factors other than distance, such as interference, can affect signal strength. For instance, if the signal strength drops due to interference rather than an actual increase in distance, the transceiver may incorrectly determine the portable device is located farther away than its actual distance or a distance that would have been determined without the interference.

Numerous technologies have centered around using signal strength of communications between a transmitter and a receiver to determine location information. However, these technologies often fail to provide accurate location information under varied circumstances. For instance, in addition to the interference issue described above, resource allocation in the portable device can adversely affect the ability to utilize signal strength as a basis for determining location information. For instance, in the context of Bluetooth communication systems, the portable device is often limited by its resources to a select number of concurrent Bluetooth operations. If the portable device is a phone that is attempting to make a Hands-Free Profile (HFP) voice connection, while at the same time trying to determine the phone's position relative to the vehicle, the portable device may prioritize the HFP connection over connections that facilitate determining the phone's position. This prioritization may be the direct result of resource allocation in the portable device, and can adversely affect the ability to determine location information about the portable device relative to the vehicle. Measurement error is also often a significant source of error—signal strength, timing, and angles measured at different times may vary due to limitations of the instruments on the devices taking the measurements or because they were taken at different times.

SUMMARY OF THE DESCRIPTION

The present disclosure is directed to a communication system with a master device configured to determine location information in real-time with respect to a portable device. The master device may direct one or more monitor devices to monitor communications that occur over a primary communication link. The one or more monitor devices may sense characteristic information about the signal from the portable device, and communicate at least one of the monitored communications and the sensed characteristic information to the master device via an auxiliary communication link. In one embodiment, the one or more monitor devices may monitor at least one message from the portable device to the master device in conjunction with sensing the characteristic information. The one or more monitor devices may communicate information relating to the sensed characteristic information as well as the at least one message.

In one embodiment, the primary communication link may be established between the master device and the portable device. And, the auxiliary communication link may be separate from the primary communication link such that the portable device is substantially unaware of messages being communicated via the auxiliary communication link between the one or more monitor devices and the master device. Use of the auxiliary communication link for the monitor devices may conserve resources on the portable device, including, for example, processor cycles, power, memory, and wireless communication controller operations.

In one embodiment, the communication system may include a plurality of fixed position devices (e.g., a master device and one or more monitor devices) that are each configured to communicate via an auxiliary communication link with at least one other of the plurality of fixed position devices. Fixed position information about each of the fixed position devices may be stored in memory that may be volatile or persistent. Aspects of the fixed position information may be stored in volatile memory while other aspects may be stored in persistent memory, or a combination thereof. In one embodiment, all, some, or none of the fixed position information may be determined at run-time. A portable device may be configured to communicate wirelessly via a primary communication link with a first one of the fixed position devices, and where a second one of the fixed position devices is configured to monitor communication over the primary communication link between the first one of the fixed position devices and the portable device. The second one of the fixed position devices may receive message contents and may sense one or more signal characteristics that may be used as a basis for determining location, including microlocation. The one or more signal characteristics may pertain to the monitored communication. Signal characteristic information relating to the one or more signal characteristics may be communicated, via the auxiliary communication link, to at least one other of the fixed position devices. Signal characteristics of signals sent via the auxiliary communication link may be communicated in conjunction with signal characteristics of the monitored communication (e.g., signal characteristics of signals sent from one fixed position device to another fixed position device via the auxiliary communication link may also be monitored, measured, communicated, or any combination thereof). Location information about the portable device may be determined based on the signal characteristic information communicated over the auxiliary communication link. The authenticity of the signal characteristic information (that is, that the information is related to communications coming from the portable device) may be determined based on the message content of the communicated signal characteristic information.

In another embodiment, the primary communication link may be a wireless Bluetooth Low Energy communication link, and the auxiliary communication link may be a wired communication bus. The master device may include a first communication interface operable to receive wireless communication transmissions from a portable device, where the first communication interface is configured to obtain signal characteristic information relating to the wireless communication transmissions received by the master device from the portable device. As an example, the first communication interface may be a Bluetooth Low Energy communication interface.

The master device may also include a second communication interface configured for communications with at least one fixed position device separate from the master device, the communications include signal characteristic information with respect to wireless communication transmissions received by the fixed position device from the portable device. For instance, the second communication interface may be a wired communication bus. The master device may further include a controller operably coupled to the first communication interface and the second communication interface, and where the controller may be configured to determine location information about the portable device based on the signal characteristic information received from the at least one fixed position device.

In yet another embodiment, a method of operation includes determining location information about a portable device. The method may include receiving, in a master device, wireless communications from a portable device via a wireless communication link, and directing at least one fixed position device to monitor the wireless communications from the portable device to the master device. The method may also include receiving, via an auxiliary communication link separate from the wireless communication link, signal characteristic information based on the wireless communication monitored by the fixed position device. Position information relating to a position of the fixed position device may be obtained, and a location of the portable device may be determined based on the communicated signal characteristic information and the position information.

In one aspect, a communication system, according to one or more embodiments described herein, may facilitate determining location information about a portable device relative to an object, such as a vehicle, building, desk, or any other object/space. Components of a communication system, such as a master device and one or more monitor devices, may be affixed relative to the object (affixed to the object, embedded within the object, placed near the object, carried by the object, or any combination thereof), and communicate information with each other to facilitate determining the location information of the portable device relative to the object. These communications or substantial portions thereof may be substantially unknown to the portable device, thereby potentially avoiding allocation of resources in the portable device for handling such communications.

In another aspect, a method, according to one or more embodiments described herein, may be capable of obtaining significantly more information from a single connection than conventional methodologies, possibly without requiring additional power consumption or utilization of additional resources on portable devices. This may facilitate overcoming deficiencies of conventional methodologies, such as measurement error.

These and other advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

A system and method in accordance with one embodiment includes a communication system with a master device configured to determine location information in real-time with respect to a portable device. The master device may direct one or more monitor devices to monitor communications from the portable device to the master device that occur over a primary communication link. The monitor devices may in turn determine signal characteristic information about the communication from the portable device, and communicate this signal characteristic information to the master device via an auxiliary communication link. Based on the signal characteristic information, the master device may determine location information about the portable device (e.g., using algorithms that may be comprised of a distance function, trilateration function, a triangulation function, a multilateration function, a fingerprinting function, a differential function, a time of flight function, a time of arrival function, a time difference of arrival function, an angle of arrival function, an angle of departure function, a geometric function, etc., or any combination thereof). In particular, the master device may determine a likely location of the portable device relative to the master device and the one or monitor devices. Additional examples of a system and method according to one or more embodiments are described in PCT Application No. PCT/US2017/027686, to Stitt et al., which is entitled "SYSTEM AND METHOD FOR ESTABLISHING REAL-TIME LOCATION" and was filed on Apr. 14, 2017, which is incorporated herein by reference in its entirety.

Figure 1:
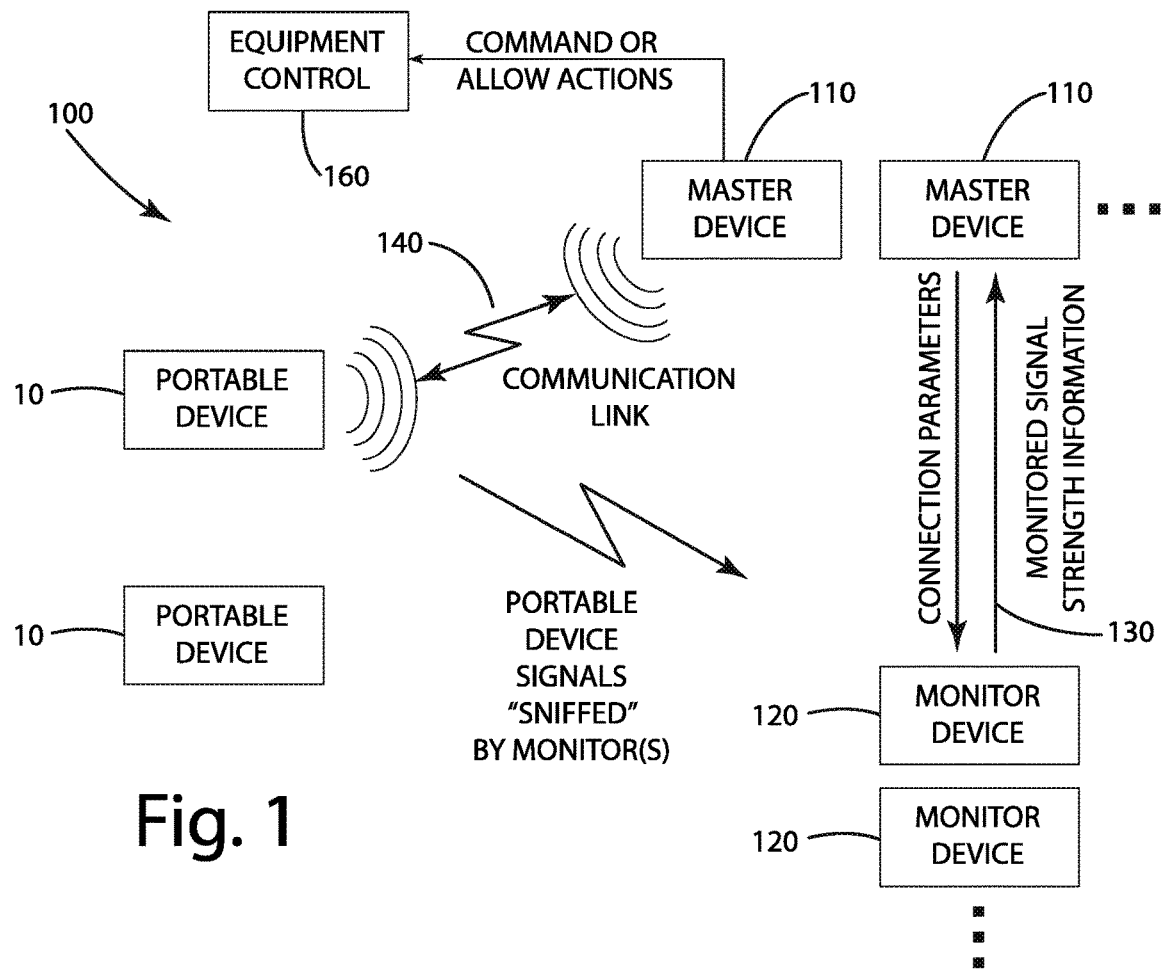
FIG. 1 shows a representative view of a communication system according to one embodiment.

A communication system according to one embodiment is shown in FIG. 1 and generally designated 100. As shown, the communication system 100 includes a master device 110 and one or more monitor devices 120. The communication system 100 may also include one or more portable devices 10 and equipment control 160. The master device 110 and the one or more monitor devices 120 may be disposed fixedly to or at a static location relative to an object or equipment, such as furniture, a vehicle, or a building as depicted in the illustrated embodiments of FIGS. 2 and 3. The master device 110 may be configured to communicate wirelessly with a portable device 10. In one embodiment, the master device 110 may include a wireless transceiver, such as a Bluetooth Low Energy (BLE) enabled transceiver, also known as a Bluetooth LE or Bluetooth Smart enabled transceiver, capable of exchanging communications with the portable device 10. It should be understood that any type of communication technology or framework may be utilized for wireless communications with the portable device 10, and that Bluetooth LE enabled transceiver technology is described herein primarily for purposes of disclosure.

The master device 110 may communicate, via an equipment communication link 150, with the equipment control 160 to provide a command to perform a state change, such as mobilizing a vehicle, opening a door, or allowing an action. The command may be any type of communication that results in an action or is a response to an action, including a) an instruction or request to do an action, enable an action or disable an action, b) a request to send data, c) an update for periodic or aperiodic data, and d) a response to a request from the equipment control 160, or any combination thereof.

The equipment communication link 150 may be any type of communication link, including any of the types of communication links described herein, including wired or wireless. In one embodiment, the equipment communication link may be established via a wired network that includes a plurality of devices, such as a CAN bus on a vehicle. It should also be understood that the equipment communication link 150 may be established in the same manner, and optionally share the same medium, as other communication links described herein, including the primary communication link 140 and the auxiliary communication link 130. For instance, both the auxiliary communication link 130 and the equipment communication link 150 may be established via a CAN bus, and optionally, via the same CAN bus. The equipment control 160 may enable or command an action or service associated with an object, such as the vehicle. As described herein, the equipment control 160 may enable a service based on a determination of a portable device 10 being at a specified location. Although the equipment control 160 is depicted separate from a fixed position device, it should be understood that the equipment control 160 may be incorporated into the fixed position device, such as the master device 110. As an example, the equipment control 160 may take the form of a software module or hardware interface incorporated into the master device 110.

In operation, according to one embodiment, when the portable device 10 moves within communication range of the master device 110, communication may be established between the portable device 10 and the master device 110. The communication range may or may not be a pre-determined range. As an example, in the case of the communication range not being pre-determined, the communication range may be vary under different applications and different circumstances, such as a different arrangement or configuration of physical objects in proximity to the master device 110, or other communication signals being present or absent, or any combination thereof. As another example, the master device 110 or the portable device 10, or both, may determine to establish communication at a range that varies based on one or more criteria being satisfied. Alternatively, the determination to establish communication may be pre-determined, such as at the boundary of appreciable communications or based on one or more criteria being satisfied.

The portable device 10 or the master device 110, or both, may periodically transmit messages (e.g., broadcast messages) on well-known channels over one or more primary wireless communication links 140. The reciprocal device, the portable device 10 or the master device 110, may periodically listen for the messages on the well-known channels from the other device, responding to the other device when it is detected. The devices may then negotiate connection parameters and a connection schedule, and then communicate during connection events according to the parameters and schedule that defines communication time and channels for use. In the realm of Bluetooth LE, the transmitting (advertising) device may take on the peripheral role and the listening device may take on the central role. In other words, the wireless communication link may be established through Bluetooth LE or any type of wireless communication protocol, including protocols that utilize scheduled connection events that the master device 110 and the portable device 10 follow for communication. The scheduled connection events may be established by negotiated time windows and communication channel sequences. In one embodiment, information relating to the scheduled connection events may be communicated via an auxiliary communication link 130 to the one or more monitor devices 120, which may use this information to enable monitoring of the primary communication link 140. In this way, the one or more monitor devices 120 may actively monitor the primary communication link 140 without actively participating in or communicating over the primary communication link 140. The role of the master device 110 in one embodiment may be shifted among the fixed devices based on a variety of factors, such as vehicle status, signal quality, portable device location, or system operating mode. For example, with a fixed position device disposed outside a vehicle, and another fixed position device disposed inside the vehicle, the role of master may shift between these two devices depending on whether the portable device is inside or outside the vehicle. The role of the master device 110 in yet another embodiment may be performed by two or more fixed position devices simultaneously, wherein the one or more monitor devices 120, or a subset thereof, are shared amongst the two or more master devices 110. The role of the master device 110 in yet another embodiment may be split amongst two or more fixed position devices, or split amongst two or more radios/processors on the same fixed position device, where each fixed position device, radio/processor, or any combination thereof, may perform a subset of master device 110 duties. As an example, the duty of establishing a connection with a portable device 10 via the primary communication link 140 may be performed by one or more fixed position devices A and the duty of communicating with monitor devices 120 via the auxiliary communication link 130 may be performed by one or more different fixed position devices B, where A and B fixed position devices communicate with one another using any available wired or wireless communications link. Such communication may enable fixed position devices A and B to share connection information, security information, measured and/or computed signal characteristics, positioning results, etc.

In the realm of Bluetooth LE communication links, a connection may define an actual established communication across a one or more channels, and channels may define one or more wireless bands (e.g., bandwidth) for communication. A connection on the primary communication link 140 may be established as a negotiated series of connection events determined by the connection parameters and connection schedule. The connection event may be considered a rendezvous between the master device 110 and the portable device 10, which in the context of Bluetooth LE may be considered the peripheral and central devices, respectively. The peripheral device may request a range of connection parameters for the schedule of connection events. The central device may establish the connection parameters and the schedule of connection events. Within a scheduled connection event, the central transmits first to establish the start of the event. If the peripheral device transmits, the central and peripheral devices may alternate transmitting until the central device has completed its transmissions. Both devices may ignore any wireless activity in a power conserving sleep state until just prior to the connection event and may ignore wireless activity again just after a connection event. Because portable devices are more easily associated with an individual person, it is considered advantageous for personal security and privacy, prior to establishing a communication link, to have the portable device start in the listening central role, making it more difficult for an adversary to track individuals. Again, it should be understood that the present disclosure is not limited to the portable device starting in the central role and the master device starting in the peripheral role.

It should also be understood that the present disclosure is not limited to Bluetooth LE. Other wireless communication links may be utilized, including those that involve devices searching for another device in range, at least one device advertising its presence by broadcasting on well-known channels, and at least one other device listening for advertising devices. In Bluetooth LE, these activities are referred to as advertising and scanning, respectively. In ANT, the master device may establish a channel by transmitting a channel ID on a fixed channel over fixed time interval, and the slave may listen for a channel ID message. Generally, in 802.11 Wi-Fi, advertising is a "probe request" and scanning is "active scan." In 802.11 Wi-Fi Frequency Hopping Networks, an Access Point may establish similar connection parameters with a beacon frame. Also, in ZigBee beacon enabled networks, network coordinators may establish these types of connection parameters in beacon frames, while end nodes may search for the coordinator through a passive scan. Additional examples of wireless communication links include Z-Wave, proprietary ultra-high frequency (UHF), microwave communication protocols, Near-Field Communication (NFC), 6LoWPAN, and Thread. ZigBee, 6LoWPAN, and Thread are based on IEEE 802.15.4. Any other type of communication protocol based on IEEE 802.15.4 may be implemented in the communication system 100 according to one embodiment of the present disclosure.

Based on location information about the portable device 10 relative to the master device 110 or the one or more monitor devices 120, or a combination thereof, the communication system 100 may facilitate real-time location based services and events, such as automated actions in response to detection of the portable device 10 in a location relative to other devices or objects. In addition to or alternative to basing automated actions on the location information, the automated actions may be based upon a confirmation of the identity (authentication) of the portable device, the authentication of the messages coming from the portable device, the permissions (authorizations) of the portable device, or the authorizations of the user account associated with the portable device, or a combination thereof. The master device 110 may command or allow actions to the equipment control 160 over the command interface 150 based upon the location and/or the authentications and/or the authorizations. For instance, if the system 100 is incorporated into a vehicle, and determines that the portable device 10 is located in the driver seat, the system 100 may communicate this position information to a vehicle control system to enable mobilization of the vehicle. A variety of other automated activities or actions may be facilitated by the communication system 100, including activities related to enhancing safety, enhancing physical security, identification of physical possession of items or equipment, and determinations that a person has moved a specific device to a specific location in relation to the system or an object known by the system. Further examples include automotive passive entry—passive start systems (PEPS), where low power systems may be beneficial to conserve battery power of the vehicle, and battery power of the portable device 10. Additional examples of automated activities include adjusting one or more parameters of the vehicle to user preferences, such as seat position, a speed governor or limiter, mirror positions, temperature preference, vehicle performance modes, and radio presets.

As described herein, the location information may be used as a basis for triggering or enabling one or more operations. Additional factors may be included in the location determination, such as GPS information obtained from a GPS module of a smart phone and accelerometer readings. One factor that may be used is whether the portable device 10 is moving or accelerating. Movement information being indicative of a person standing still may facilitate a determination to initiate unlocking. This is primarily because if the system 100 knows a) the person or portable device has moved close to the vehicle door and b) the movement has diminished to little or no movement, it is likely a person is standing near the door and would like to enter the vehicle 10. Movement information being indicative of movement generally, or an angle of approach toward the vehicle (e.g., a direction of motion of the portable device 10 with respect to the vehicle), may facilitate a determination of one or more likely future vehicle functions, such as that an unlock function would likely be desired by the approaching person.

In one embodiment, one or more monitor devices 120 may sense angle of arrival (AOA) with respect to the portable device, and may transmit information related to this type of sensed characteristic instead of or along with other information related to one or more sensed characteristics, such as received signal strength indicator (RSSI) or sensed signal strength. Time of arrival (TOA) of a message, and time difference of arrival (TDOA) relative to an antenna array, are additional examples of sensed characteristics that may form the basis for signal information transmitted to the master device. As described herein, the angle of arrival information may be used as a basis for triangulating the location of the portable device.

In one embodiment, the communication system 100 may determine location information based on one or more preset criteria (e.g., fingerprinting) of the signal characteristic information (e.g., angle of arrival/departure, signal strength or RSSI, time of flight, etc.) sensed from the one or more monitor devices 120.

The one or more monitor devices 120 may communicate signal characteristic information representative of what each respective monitor device 120 has determined for the one or more sensed characteristics, including computed characteristics (e.g., an angle, time of flight, distances, etc., between the portable device 10 and the respective monitor device 120). Any of this information may be sent to the master device 110. One or more of diagnostic information, health information, current time, and connection parameters may also be communicated from the one or more monitor devices 120 to the master device 110. Through collection and analysis of such information from multiple devices, the master device 110 may be configured to provide a level of fault tolerance with respect to location determinations, even in cases where one or more monitor devices 120 have failed.

As another example, the system 100 may be incorporated into a building or a collection of buildings, such as a university campus, including multiple master devices 110 operating in conjunction with other fixed position devices, such as one or more monitor devices 120. A communication system 100 distributed in this manner may enable real-time location of a plurality of portable devices 10, and facilitate selective entry through a doorway 4 of one or more buildings 3. Real-time location in this realm may enable access to dormitories when a mobile phone (and user) is located inside or outside the building 3, or near or far away from a doorway 4 of the building. In yet another example, the system 100 may be incorporated into a sensor or sensor system that passively determines location information about one or more portable devices 10 that move into or away from proximity to the sensor or sensor system, or move within proximity to the sensor system. The sensor or sensor system may store this location information, or transmit it to another device, or perform some analysis and take action that is not directly perceptible to the user associated with the portable device. In this sense, the sensor or sensor system may be considered to perform an equipment operation.

In embodiments in which the portable device 10 is a mobile device, like a phone or tablet, the communication system 100 may facilitate a variety of activities. These types of devices have become nearly ubiquitous in everyday life, and often maintain connections to the Internet and have access to personal information. Such devices also may allow for verification of user credentials, and authorizations. Because users often keep such devices in their personal possession, and do not frequently share them with other users, utilizing a mobile device in the communication system 100 according to one embodiment may function as a proxy for the location of a person. In other words, presence of a mobile device is a strong indicator of the location of a person primarily associated with the device.

A communication system according to one embodiment of the present disclosure may enable real-time location services with respect to a portable device 10 relative to one or more fixed devices. As mentioned above, the portable device 10 may maintain a primary communication link 140 with one of the fixed devices (e.g., the master device 110). In this way, the portable device 10 may avoid establishing a communication link with the other fixed devices (e.g., the one or more monitor devices 120), and therefore conserve or reduce resources, such as processing cycles, memory, and power consumption, that would otherwise be associated with such communication links. An additional example of a resource conserved through implementation of a communication system 100 may include less usage of RF communication bandwidth. In the realm of Bluetooth LE, the communication system 100 may enable more precise microlocation of Bluetooth enabled devices, while using fewer Bluetooth resources within the device as compared to conventional systems, and while also avoiding significant power usage and significant radio bandwidth. Further, the communication system 100 may enable enhanced accuracy with respect to location of a portable device 10, despite at least one of noisier environments in the 2.4 GHz range and physical changes of the locale in ways that alter the Bluetooth LE 2.4 GHz signal paths, as described herein.

More specifically, in the context of Bluetooth LE, the communication system 100 may enable real-time location of a portable device 10 using multiple fixed position devices, while also potentially avoiding multiple communication links between the portable device 10 and the fixed position devices, such as the master device 110 and the one or more monitor devices 120. The communication system 100 may utilize one or more primary communication links 140 between the portable device 10 and a master device 110, and an auxiliary communication link that is separate from a primary communication link 140 and established between the master device 110 and one or more monitor devices 120. In this way, portable device 10, on a primary communication link 140, may utilize generally high connection event rates (e.g., 20 Hz or 40 Hz) as opposed to allocating resources and connection events for communication links with multiple monitor devices. It should be understood that the portable device 10 may establish more than one primary communication link 140 with more than one fixed position device.

The auxiliary communication link 130 may provide a private communication path for the master device 110 and the one or more monitor devices 120 to potentially avoid utilizing resources of the portable device 10 to provide information to one or more monitor devices 120.

Although the communication system 100 is described primarily in connection with a Bluetooth LE communication system, it should be understood that the present disclosure is not so limited, and that one or more embodiments herein may provide similar functionality in systems that use other wireless protocols, including wireless protocols that involve multiple channels, channel hopping, bad channel maps, connection events, or encrypted communication, or a combination thereof.

I. Master Device and Monitor Device

The master device 110 may be incorporated into other components of the object to which it is fixedly disposed, including, for example, integrated control circuitry configured to operate as the master device 110 and to control additional components of the object that are generally considered conventional. In the realm of vehicles, for example, the master device 110 may be incorporated into an integrated Bluetooth interface for enabling a vehicle operator to initiate a hands-free call, and may communicate with a vehicle engine control module which functions as the equipment control 160 in the illustrated embodiment.

Figure 4:
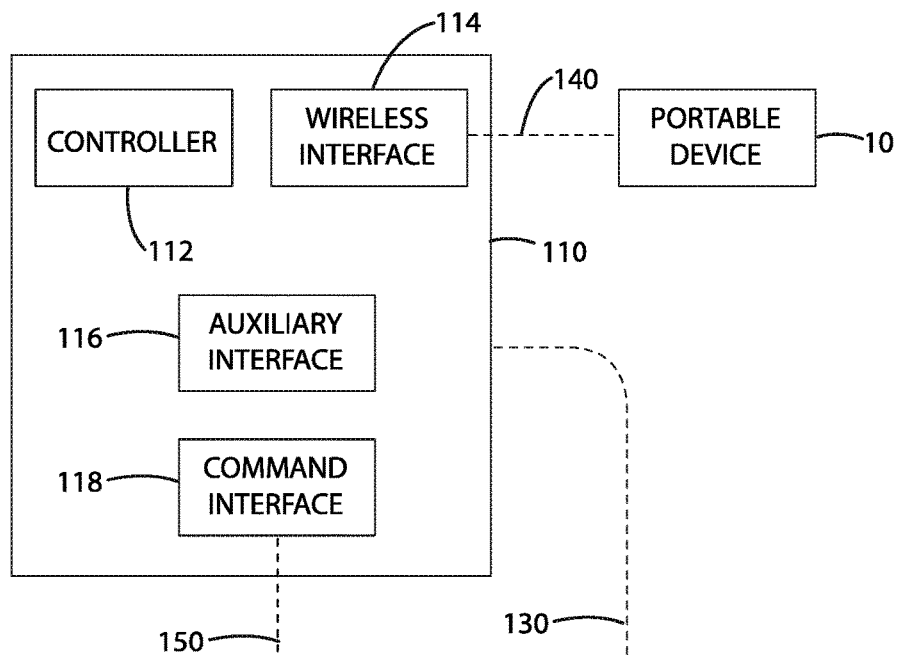
FIG. 4 shows a representative view of a master device of the communication system according to one embodiment.

The master device 110 according to one embodiment is depicted in further detail in FIG. 4. The master device 110 in the illustrated embodiment includes a controller 112, a wireless transceiver interface 114, and auxiliary communication interface 116. Although components of the master device 110 are depicted separately, it should be understood that one or more aspects of each of these components may be integrated into a single component. The controller 112 may be an integrated chip controller having a processor, one or more timers, general purpose I/O, and memory. The memory may be persistent (e.g., ROM) or volatile (e.g., RAM), or a combination thereof. The wireless transceiver interface 114 may include one or more antennas and a transmit and receive radio. The controller 112 may be programmed to communicate wirelessly via the wireless transceiver interface 114 with a portable device 10. The wireless transceiver interface 114, as discussed above, may be any type of wireless communication interface, including, for example, Bluetooth LE.

In the illustrated embodiment of FIG. 4, the master device 110 includes an auxiliary communication interface 116 configured to communicate with at least one monitor device 120 via a communication link 130 separate from a primary communication link 140 utilized by the wireless communication interface 110 to communicate with the portable device 10. For instance, the auxiliary communication interface 116 may include a wired interface, such as CAN Bus or another differential twisted pair interface, a single wire interface (e.g., LIN Bus), a coaxial-based interface, or an optical interface, to facilitate communication with one or more monitor devices 120. The wired interface may utilize pre-existing electrical wiring of the object to which the master device 110 is disposed, or may be separate from other communication aspects of the object. In this way, the auxiliary communication interface 116 may provide an auxiliary communication link 130 separate from the primary communication link 140 utilized for communication between the master device 110 and the portable device 10. In one embodiment, the wired interface may include direct point to point wiring, such as coax, between the master device 110 and each of the one or more monitor devices 120.

As another example, the auxiliary communication interface 116 may be a wireless interface, such as Bluetooth LE or ANT, which utilizes an auxiliary communication link 130 separate from the primary communication link 140. In other words, the auxiliary communication link 130 may utilize the same or different communication technology as the primary communication link 140, but may utilize a separate communication path, connection(s) or channel(s). For instance, the two interfaces may be implemented by the same integrated circuitry and may share at least one antenna. In the context of Bluetooth LE, there may be at least 40 radio communication channels available, each spaced 2 MHz apart. Many more simultaneous Bluetooth LE connections are possible, because in addition to the RF communication channels, each connection is often a series of short connection events with a start time, a channel sequence, a connection interval, and a bad channel map. One or more of these connections may be dedicated to the primary communication link 140, and one or more others of these connections may be dedicated to the auxiliary communication link 130.

The auxiliary communication link 130 may enable the portable device 10 to substantially ignore or to be blind to communications occurring over the auxiliary communication link 130, thereby conserving resources, such as processing cycles and memory, for use with the primary communication link 140 in communications with the master device 110. In one embodiment, the auxiliary communication link 130 may be considered a private communication link separate from the primary communication link 140 to the portable device 10. Although the auxiliary communication link 130 and the primary communication link 140 may be considered separate, the controller 112 may have the communication schedules for the links in memory, and may control the schedules to substantially minimize timing conflicts or resource conflicts in master device 110 or the monitor devices 120.

Figure 5:
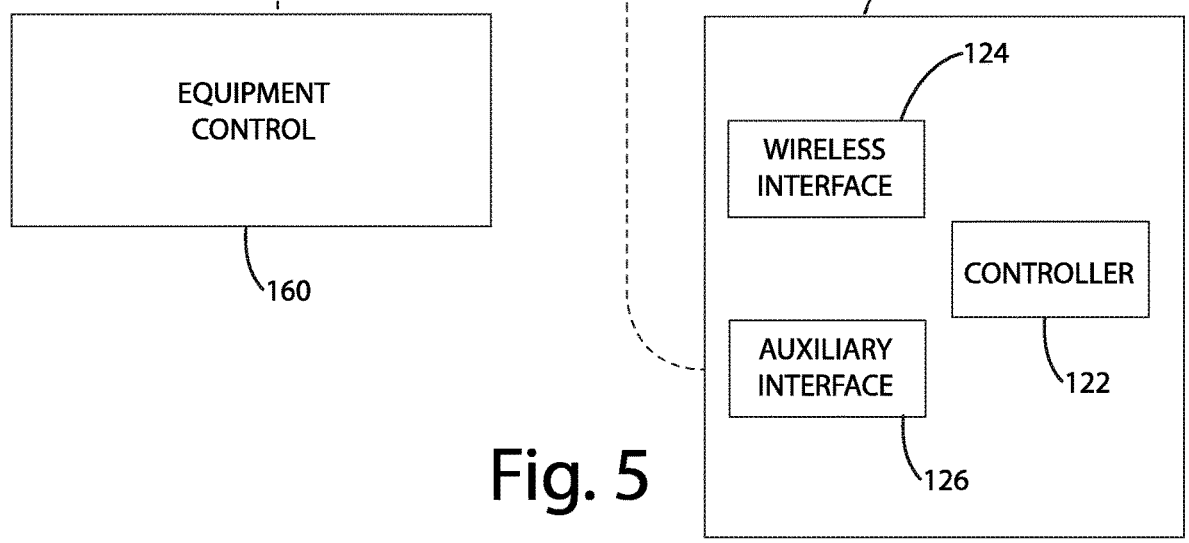
FIG. 5 shows a representative view of a monitor device of the communication system according to one embodiment.

In the illustrated embodiment of FIG. 5, a monitor device 120 according to one embodiment is depicted with a controller 122, a wireless communication interface 124, and an auxiliary communication interface 126. These are similar respectively to the controller 112, the wireless communication interface 114, and the auxiliary communication interface 116 of the master device 110 but with several exceptions. For instance, the monitor device 120 may include one or more processors (controllers 122) and one or more antennas and transmit and receive radios. The wireless communication interface 124 of the monitor device 120, instead of establishing a communication connection with the portable device 10, may monitor communications from the portable device 10 to the master device 110. In this way, the wireless communication interface 124 of the monitor device 120 may "monitor", "spy" on, or "sniff" communications from the portable device 10. The term "monitor", "spy" on, or "sniff" in the present disclosure means to detect one or more signal characteristics of the communications, including, for example, receiving message contents of the communications and/or sensing one or more signal characteristics useful for determining location, preferably for determining microlocation. The one or more signal characteristics may include power in one or more channels during the monitored device's transmission, power in one or more channels prior to the monitored device's transmission, power in one or more channels after the monitored device's transmission, time of arrival, time difference of arrival, angle of arrival, or angles of arrival, etc., or a combination thereof. As compared to alternative approaches without sniffing, including one where the portable device 10 may maintain one or more connections with each fixed position device (or where advertisements from fixed position devices alone are used), sniffing may allow a master device 110 to obtain temporally-, frequency-, and spatially-correlated data, or a combination thereof; furthermore, data may be obtained at a much higher rate. It should be understood that communications transmitted from the master device 110 or other monitor devices 120 may also be sniffed. The monitor device 120 may transmit to the master device 110 received messaged content of the sniffed communications with the portable device 10 and/or characteristic information based on the message content, facilitating authentication of the communications and authentication of the signal characteristics. The authentication may verify that the communications come from a specific portable device, or that the communications come from a specific application running on a portable device, or that the communications come from an application that has authenticated access to a specific user account, or a combination thereof. The authentication process may facilitate an authorization process. For the present disclosure, authentication processes verify identity, and authorization processes verify privilege. The monitor device 120 may transmit to the master device 110 signal characteristic information about the sniffed communications with the portable device 10, facilitating determining a location of the portable device 10.

In one embodiment, the portable device 10 may also measure one or more signal characteristics from messages received from the master device 110 (e.g., RSSI of messages), or from other events of or actions performed on the portable device 10 (e.g., a change of state, such as screen on/off, average noise floor, rate of motion, on a call, no light, proximity sensor indicating something near, motion detected or not, velocity etc.). The portable device 10 may communicate this sensed information to the master device 110 to facilitate determining a location of the portable device 10. Additionally, or alternatively, the portable device 10 may collect sensor data from one or more sensors, and provide this sensor data to the master device 110. Example sensors include an accelerometer, magnetometer and a GPS.

In one example, the portable device 10 may determine the RSSI of a request packet received from the master device 110, and include that measurement in a subsequent response packet transmitted to the master device 110. The master device 110 may compute the difference between the two RSSIs as a way to compute an offset (a dynamic calibration parameter) to apply to measurements obtained near that point in time (to compensate for persistent or dynamic differences in transmit power, transmitter/receiver polarization/orientation/radiation patterns, obstacles, distance, etc.) between the portable device 10 and the master device 110.

Additionally or alternatively, the portable device 10 may alter the content of messages transmitted to the master device 110, based upon the content of messages received from the master device 110, to facilitate determining a more accurate location of the portable device 10. For example, the portable device 10 may deliver information requested, alter its behavior, or condition future messages based upon the content of a message received from the master device 110. In one embodiment, the master device 110 may provide the portable device 10 with correlating information (e.g., the channel/frequency on which it will transmit during the next connection interval, a frame/sequence number, or other relevant information), where the portable device 10 may then alter the content of messages sent to the master device 110 to support, improve, correlate, or any combination thereof, signal characteristic measurements performed by the master device 110, monitor devices 120, or both. The master device 110 may not use such communicated information, if the portable device 10 has not been authenticated and/or authorized.

The controller 112 of the master device 110 may determine that it has confirmed the authenticity of the communications with the portable device 10, the authenticity of the portable device, the authenticity of the sniffed communications with the portable device, the authorizations (permissions) of the portable device, or the location of the portable device, or a combination thereof. Based upon confirming (verifying) this information regarding the location, authenticity of the portable device, the authenticity of the communications with the portable device, and the authorizations of the portable device, the master device 110 may command, receive, or allow actions by the equipment control 160 using a command interface 118. The command interface 118 in one embodiment may facilitate establishing the equipment communication link 150.

The controller 122 of the monitor device 120 may direct the wireless communication interface 124 to monitor communications from the portable device 10 in response to a command received from the master device 110 via the auxiliary communication interface 130. In one embodiment, the controller 122 may receive schedule information or connection information, or both, from the master device 110 with respect to the primary communication link 140. The monitor device 110 may utilize this information to sniff communications from the portable device over the primary communication link 140, and to determine one or more signal characteristics of the communications transmitted from the portable device, including, for example, signal strength, angle of arrival, angle of departure, time of arrival, time difference of arrival, time of flight, message content, a message hash, etc.

The one or more signal characteristics of transmissions from the portable device 10 that are detected by the monitor device 110 may be indicative of a communications quality/strength, distance, orientation (angle), zone, obstacle, or any combination thereof, between the portable device 10 and the monitor device 120. The monitor device 110 may communicate information relating to the detected one or more signal characteristics to the master device 110, which in turn may use the signal characteristic information as a basis for determining a location of the portable device in real time.

As an example, the location determination may be conducted through trilateration of distances determined based on signal characteristic information. In another example, the location determination may be conducted using triangulation based on angles determined from the signal characteristic information. In yet another example, the location determination may be conducted using an algorithm that combines multiple positioning and differential approaches, signal characteristic information from one or more primary communication links 140 and/or one or more auxiliary communication links 130, machine learning, artificial intelligence, zone configuration, environmental configuration (including obstacle or reflector identification), or any combination thereof, to yield one or more highly probable location determinations and their corresponding confidences. Heuristics may or may not be probabilistic. For example, in one embodiment, location determination may be conducted using a probabilistic heuristic that uses one or more fingerprinting models based upon one or more signal characteristics (e.g., RSSI, angle of arrival, etc.), or one or more positioning approaches (e.g., trilateration, triangulation, differential, etc.), or any combination thereof, within an N-level neural network to determine position (e.g., where N=3, wherein layer 1 consists of one or more probabilistic fingerprinting heuristics that output one or more sets of weighted possible position scores from signal characteristic inputs from one or more fixed position devices, wherein layer 2 uses layer 1 outputs as inputs to one or more probabilistic heuristics to produce a filtered set of weighted possible position scores, and finally, wherein layer 3 [the output layer] uses layer 2 outputs as inputs to determine a most likely location [i.e., distance, zone, confidence, etc.]). In such an approach, machine learning techniques (e.g., back propagation, gradient descent, linear regression, logistic regression, etc.) may be used, either offline (i.e., ahead of time) or online (i.e., dynamically in real-time), to determine (train) the optimal values for the weights of the parameters of the artificial intelligence constructs, including probabilistic heuristics, models, neural network nodes, scores, filters and filter rates, and other portions of the algorithm (e.g., likelihood of a particular zone transition, likelihood of a particular state, sensor offsets/adjustments, etc., given past performance and present determined state).

In accordance with one embodiment, the fingerprinting algorithm maps a data set to an identifying construct—its "fingerprint." A fingerprint may or may not be unique—it may be used to identify something (e.g., a human fingerprint uniquely identifies a person) or it may be used to classify something. Classifications may be singular (e.g., photographs containing dogs, this animal is a snake, or this file is virus ABC) or a set of candidate classifications (e.g., these animals have four legs and fur, these are the types of cameras that meet criteria XYZ). A secure hash is a fingerprinting algorithm that maps an arbitrarily large data set to a relatively small, fixed-size, and virtually unique, identifier. Computer programs, such as virus scanners and search agents, use fingerprinting algorithms to find computer files with similar characteristics.

In the context of a microlocation system, a fingerprinting algorithm may map a collection of inputs (e.g., signal characteristics, portable device state, system state, user activity, previous outputs [such as previous position determinations], previous state, etc.) to a location, distance, velocity, activity, set of obstacles, subsequent algorithm selection, or any other potential output that may be derived from the set of inputs, or any combination thereof. The set of data used as inputs, the set of potential outputs, the relationships that are created and exploited between said inputs, the mapping of said inputs and relationships to outputs, and the set of operations that may be performed as part of the processing used to produce one or more outputs from the set of inputs, may be referred to as the fingerprinting model.

A fingerprinting analysis may be an algorithm or a heuristic. A fingerprinting algorithm may be in part or in whole a heuristic. A fingerprinting heuristic may be in part or in whole an algorithm. For the purposes of this disclosure, the terms "fingerprinting analysis," "fingerprinting algorithm," and "fingerprinting heuristic" may be used interchangeably, unless specified otherwise, and all refer to a fingerprinting approach of any underlying implementation/strategy. A fingerprinting algorithm executes the fingerprinting model, and thus, the fingerprint model is considered part of the fingerprinting algorithm. A fingerprinting model may be purely algorithmic, purely heuristic, or a combination of both (hybrid). A fingerprinting algorithm may consist of one or more models. An example of a purely algorithmic fingerprinting model may be one in which all possible inputs and values are mapped directly to one or more outputs (e.g., given N signal characteristics with M possible values for X fixed position devices each with Y possible locations, N*M*X*Y mappings exist). An example of a purely heuristic fingerprinting model may be one in which there is no direct mapping of inputs to outputs, and the mapping of inputs to outputs is performed by exploiting real-world relationships between inputs (e.g., if X is greater than Y, then my output is A, and if X is less than Y, then my output is B, and if X equals Y, then my output is unknown). An example of a hybrid (combination) fingerprinting model may be one in which a heuristic is used to determine which set of mappings to use (which may be a partial mapping of relevant inputs and outputs, given heuristic results), or vice versa (including wherein algorithmic models and other algorithms are used as inputs to various heuristics).

A probabilistic fingerprinting heuristic, for example, may be a fingerprinting algorithm that uses a probabilistic approach to select the most likely output given a set of outputs from a fingerprinting heuristic that uses a fingerprinting model to produce a set of outputs, each with an associated likelihood. The likelihood of a particular output may be computed by any means. In one embodiment of a probabilistic fingerprinting heuristic, one or more likelihoods may be computed by weighting and combining relationships between signal characteristics between different fixed position devices in a way that produces a score that represents the likelihood that a given portable device is in a given location, for each possible location. The corresponding likelihoods of the one or more outputs may then be altered by other algorithmic or heuristic processes (from the same or additional inputs). The higher the likelihood of a particular output, the greater the confidence may be in that output. Additionally, or alternatively (such as in the case where the fingerprinting algorithm is not probabilistic [i.e., where likelihoods are not provided with outputs]), higher confidence in a particular output may be obtained by using additional algorithmic or heuristic processes (from the same or additional inputs). Multiple fingerprinting algorithms may also be executed, sequentially or in parallel, on the same or different inputs, and their outputs combined, to further increase or decrease confidence in a particular output or set of outputs. For example, multiple fingerprinting heuristics may be executed with the same data, and if they all produce the same output, higher confidence may be placed on that output. Additionally, for example, multiple probabilistic fingerprinting heuristics may be executed with the same data, and the set of outputs and their corresponding likelihoods may be combined, such that the resultant set of outputs with the combined likelihoods increases or decreases the confidence in one or more outputs (e.g., maximum, multiplication, summation, A*, artificial neural networks, Bayes' theorem, regression, etc.). If the confidence in a particular output is much higher than others, or it has reached a threshold, or some other decision criteria has been satisfied, or any combination thereof, the algorithm may decide upon (or select or return) that output (e.g., select that location). If there is a set of outputs with such high confidence, the fingerprinting algorithm may return said set of outputs (with or without their corresponding likelihood). Alternatively, the fingerprinting algorithm may return all outputs (with or without their corresponding likelihood) and allow another algorithm or process to decide what action to take (if any). Additionally or alternatively, such as if confidence is low (i.e., it is unclear which output is correct, either because all likelihoods are low or multiple are high, or some other combination thereof), the fingerprinting algorithm or system may utilize one or more additional or alternate fingerprinting models, one or more additional or alternate algorithms or heuristics, alter its behavior or its set of inputs or outputs, or any combination thereof. It should be noted that while the above is described in relation to fingerprinting algorithms and heuristics, it also may be applied to, used in conjunction with, or used as part of, any other algorithm (such as triangulation, trilateration, multilateration, differential, and so on). Also, as described previously, machine learning and artificial intelligence techniques and approaches may be used within, to join, or select outputs amongst, said algorithms (e.g., to train weights, combine probabilities/likelihoods, determine and combine outputs, etc.).

In operation, the monitor device 120 according to the illustrated embodiment may transition from an unpowered or low-power, non-operating state to an operating state in response to a command from the master device 110. The monitor device 120 may wake up from the unpowered or non-operating state in a variety of ways. As an example, if the monitor device 120 is unpowered, the auxiliary communication link 130 may be a wired interface that enables the master device 110 to transmit power or control power supply to the monitor device 120 to facilitate transition from a non-operating state to an operating state. As another example, if the monitor device 120 remains powered substantially continuously, the monitor device 120 may periodically wait to receive commands from the master device 110 via wired or wireless communication links. The monitor device 120 may transition to a low-power state during periods between the time the monitor device 120 is waiting, using a timer in the controller 122 to determine when to transition back to a waiting state. If no portable device 10 is present near the master device 110, the master device 110 may direct the one or more monitor devices to transition to a non-operating or low power state.

The master device 110 may stay in an operating state to detect presence or communications from the portable device 10, and to command the one or more monitor devices 122 transition to an operating state in response to such detection. The master device 110 may remain in the operating state such that it continuously or intermittently monitors for communication from the portable device 10. Additionally, or alternatively, the master device 110 may remain in the operating state such that it continuously or intermittently broadcast requests for communication from the portable device 10.

The master device 110 and the monitor device 120 are described herein using various terminology including fixed position devices and fixed devices. Further the master device 110 can be referred to as a master device fixed device, and the monitor device 120 can be referred to as a monitor fixed device.

In the illustrated embodiment of FIGS. 1 and 4-5, the communication system 100 includes a master device 110 and one or more monitor devices 120, all of which are sometimes described as fixed position devices. The monitor devices 120 and the master device 110 may share several components and functionality, including a wireless communication interface 114, 124 capable of receiving communications from the portable device 10, and an auxiliary communication interface 116, 126 enabling communication with each other. Accordingly, in one embodiment, the role of master device may change among the fixed position devices during operation. In another embodiment, each of the fixed position devices may be substantially the same structurally, and may be configured to operate as either a master device or a monitor device. Further, it should be understood that the present disclosure is not limited to a single master device. There may be multiple master devices in the communication system 100.

Both the master device 110 and the monitor device 120 may include one or more antennas for transmitting communication wirelessly or receiving communication wirelessly, or both. Embodiments in which multiple antennas are used may be constructed such that each of the antennas utilize separate reference planes or ground planes. Both master device 110 and monitor device 120 antennas may use any polarization; however, circularly polarized antennas may provide an advantage over linearly polarized antennas, in that they may reduce the influence of portable device 10 rotation/orientation/radiation patterns on measured signal characteristics.

In one embodiment, an attenuation or reflecting component(s), such as metal or metal plates, may be disposed on or in proximity to the one or more of the fixed position devices to affect the communication signal received from the portable device 10. The attenuation component may affect the signal strength of the communications received by the fixed position device, possibly fully or substantially attenuating the signal of communications such that the communications are substantially undetected by the fixed position device. In the illustrated embodiment, a sensor or monitor device 120 may be disposed inside a door, and the outer skin of the door and window may affect the antenna pattern of the antenna of the monitor device 120 such that the monitor device 120 is configured to substantially sense signals inside the cabin of the vehicle and not outside the vehicle. If the door skin is not metal or made of an electromagnetic permeable material, an attenuation component may be disposed near the monitor device 120 to achieve an antenna pattern similar to a configuration in which the door skin is metal. In one embodiment, one fixed position device may be disposed outside the vehicle, and another fixed position device may be disposed inside the vehicle and in proximity to the attenuation component (e.g., inside the door cavity), and the difference between the two signals may be used as a basis for determining whether the portable device 10 is inside the car.

The one or more antennas of the master device 110 or the monitor device 120, or both, according to one embodiment may be any type of antenna, including a directional antenna or an omnidirectional antenna, or a combination thereof. Directional antennas may be utilized in the monitor device 120 or the master device 110, or both, to facilitate determining location information about the portable device 10. In embodiments that utilize directional antennas, the one or more signal characteristics of communication detected by the directional antenna may vary significantly depending on the location of the portable device 10. For instance, if the directional antenna is configured with a narrow radio beam width, a detected signal strength may be low for communications emanating from a portable device 10 that is located close to the antenna but off to the side of or behind the beam. On the other hand, the more narrow radio beam width may enable the directional antenna to detect communications emanating from a portable device 10 that is located within the beam and far from the antenna. It should be understood that not all fixed position devices in the communication system may utilize the same type of antenna—for example, in one embodiment, the master device 110 and one monitor device 120 may utilize omnidirectional antennas, and another monitor device 120 may utilize a directional antenna. In this context, the detected signal strength information received from the monitor devices 120 may be a function of the antenna beam or antenna configuration. The location determination of the portable device 10 based on the detected signal strength information may compensate for such antenna parameters. Other factors, such as surrounding structural features, may also be accounted for.

In one embodiment, the antenna(s) of the fixed position devices may include a switching antenna or an antenna array (e.g., phased array, directional array, end-fire array, etc.) or orthogonal antennas (with high directionality or omni-directionality), depending on the environment to enhance performance. Switching of the antennas may be conducted as part of a location strategy for collecting one or more sensor characteristics, and may be varied depending on mode. For example, the system may change between antenna modes or types, or both, depending operating conditions or status. For instance, if the portable device is considered to be far away from the system, the system may prioritize or configure the antenna for a more rough estimate of location with respect to the portable device. As the portable device moves closer to the system, the system may prioritize for a more accurate determination of the location of the portable device, and so the antenna configuration may be configured for more accurate determination. Alternatively, a fixed position device may switch or reconfigure antennas as part of a data collection algorithm or communications protocol, such as rotating through antennas to determine signal characteristics for the same signal (or temporally correlated signals), to determine angle of arrival, to set angle of departure, to focus on a particular zone, etc. Alternatively, a fixed position device may receive inputs from multiple antennas simultaneously (i.e., without switching between them).

II. Portable Device

The portable device 10 may be any type of device not physically affixed to the object on which the master device 10 is disposed or associated with. An example of such a portable device 10 is a smartphone or mobile phone capable of running one or more smartphone applications and being carried by a user. Additional examples of a portable device 10 include a keyfob, keytag, wallet card, smart watch, wearable electronics, or a combination thereof. The portable device 10 may include a control unit and one or more transceivers capable of wireless communication, including, for example, a Bluetooth LE transceiver, a Wi-Fi transceiver, and a cellular transceiver. The portable device may include a locating system. The locating system may include angular rate sensors, accelerometers, magnetometers, ultrasonic speakers/microphones, Global Positioning System receivers, or any combination thereof. The sensors in the portable device may be able to determine the orientation and/or the position of the portable device relative to the Earth. The components associated with principal operation of the portable device 10 (and not associated with the system 100) are generally considered conventional, and therefore will not be described in detail. For instance, in the context of a smart phone, no effort is made to describe the electronic components associated with the smart phone itself, such as the user interface and display. It should be understood that the portable device 10 is not limited to a smart phone; rather, one or more embodiments described herein in connection with a smart phone for purposes of disclosure.

It should be understood that more than one portable device 10 may be used in connection with the communication system 100. Further, in one embodiment, one or more portable devices 10 may be disposed on or in proximity to the object or equipment, and may communicate with the communication system 100. As an example, a tire pressure sensor (e.g., a TPMS) may operate with the communication system 100, and in response to a signal that pressure is low in a tire, the communication system 100 may determine the location of the tire pressure sensor that is indicating the low pressure signal. Additional examples include BLE security sensors, or sensors that detect any one of shock, motion and temperature aspects of the object.

III. Establishing and Monitoring the Primary Communication Link

Figure 6:
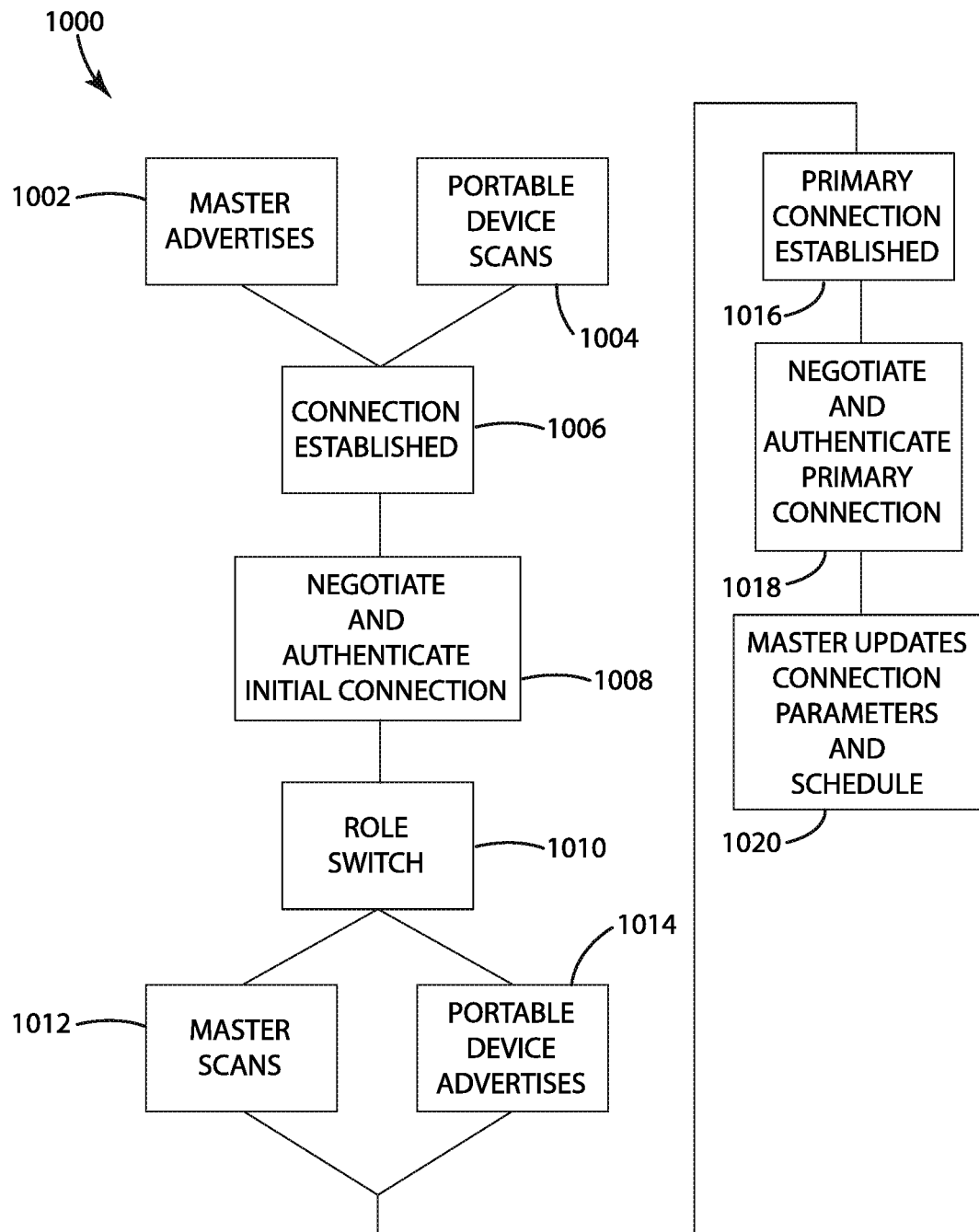
FIG. 6 shows a method of establishing a primary communication link in the communication system according to one embodiment.

A method of communicating according to one embodiment is shown in FIG. 6, and generally designated 1000. The method may be implemented in a communication system similar to the communication system 100 described herein, including one or more master devices 110, one or more monitor devices 120, and one or more portable devices 10. For purposes of disclosure, the method of communicating is described using Bluetooth LE as the communication framework. However, it is to be understood that the method may be implemented in any type of communication framework. The method 1000 generally includes establishing an initial connection on the primary communication link 140 between the portable device 10 and the master device 110, where the portable device 10 provides connection parameters. And, after the initial connection is established, the master device 110 may negotiate a primary connection on the primary communication link 140 where the master device 110 provides connection parameters. After the primary connection is established, the master device 110 and the portable device 10 may drop the initial connection. It should be understood that, in one or more embodiments, the initial connection may be utilized as the primary connection.

In the illustrated embodiment, the master device 110 may advertise, and the portable device 10 may scan for advertisements in order to initiate negotiation and establishment of the initial connection. Steps 1002, 1004. Advertising in this context may include broadcasting packets on well-known communication channels. The broadcasted packets may include a variety of information about the master device 110. For example, the master device 110 may advertise that it is a member of a class of equipment, or it may advertise that it is a specific piece of equipment. The portable device 10 may scan for equipment within a specific class or for a specific piece of equipment, and determine based on this information whether to respond to the advertised packets. In Bluetooth LE, this type of information may be defined as services in an advertising packet from the master device 110. A variety of Bluetooth LE connection types may be utilized in the initial connection or the primary connection, or both, including, for example, "just works" and "pass key entry."

The method 1000 is not limited to embodiments in which the master device 110 advertises and the portable device 10 scans to establish the initial connection. An opposite arrangement may be utilized to establish a connection, where the portable device 10 advertises, and the master device 110 scans. Wireless network arrangements in which the portable device 10 scans, and the master device 110 advertises may be a more likely arrangement than the opposite arrangement due to several potential advantages. For instance, if the portable device 10 is associated with a person, the portable device 10 can silently scan for an advertiser and avoid transmitting. In this way, the portable device 10 may enhance security against adversaries determining the location of the person. As another example, when scanning for various different advertising devices, the portable device 10 may conserve energy because in contrast to scanning, advertising uses less power and tends to not be limited by available battery energy. Further, by scanning instead of advertising, the portable device 10 may simultaneously scan for advertisers of both related and unrelated systems, as compared to advertising which may tend to be a more active and focused effort to establish communication. In yet another example, in cases where the portable device 10 includes a user interface, or an Internet connection to devices or computers that provide a user interface, the user interface may be used to configure the classes of equipment or specific equipment for which the user is interested in scanning. This topology, where the portable device 10 includes a user interface, may be more useful than the topology where the roles are reversed—that is, the reversed circumstance in which the master device 110, or the object (or equipment) to which the master device 110 is associated, includes a path to a user interface that enables configuration of the master device 110 to scan for select portable devices 10 or classes of the portable devices 10.

It is noted that in the realm of Bluetooth LE, the advertising device, or the master device 110 in the illustrated embodiment, may include information in the advertisement relating to the RF power (signal strength) of the transmissions. With this RF transmission power information, the scanning device may determine distance information about itself relative to the advertising device. For instance, by comparing the RF transmission power information to a sensed power level of the RF transmission, the scanning device may estimate its distance to the advertising device. In the illustrated embodiment of FIG. 6, regardless of which device scans or advertises, when a scanning device finds an appropriate advertising device, the scanning device may measure the receive power in the signal received from the advertising device. Using knowledge of the transmission RF power of the advertising device signal, the scanning device (such as the portable device 10) may calculate or estimate a distance to the advertising device (such as the master device 110). Using this calculated distance information, the scanning device may determine if the distance is such that the two devices are close enough to proceed to establish a connection on the primary communication link 140. Alternatively, or additionally, the scanning device, such as the portable device 10, may attempt to establish a connection whenever it discovers the master device 110 is advertising, regardless of determined distance information. Alternatively, or additionally, an angle of departure (or other angular information, such as the angle of arrival of a previously received packet) may be included in the advertisement.

Additionally or alternatively, one or more of the fixed position devices may vary transmit signal strength. For example, at least one of the master device 110, the portable device 10, and the one or more monitor devices 120 may vary signal strength to facilitate location determination, or to aid in reducing or eliminating interference, or both.

After the scanning device or the portable device 10 responds to advertisements from the master device 110, the two devices may be considered to be connected. Step 1006. In the illustrated embodiment, with reference to Bluetooth LE terminology, the portable device 10 may be the scanning device, and the master device 110 may be the advertising device. This arrangement may be established prior to the connection during a configuration phase that may be conducted during installation or at manufacture. When the portable device 10 and the master device 110 connect according to these roles, the portable device 10 is the Bluetooth LE central device, and the master device 110 is the Bluetooth LE peripheral device. The Bluetooth LE central device, in this case the portable device 10, may control the connection parameters that define a connection schedule for the initial Bluetooth LE connection between the portable device 10 and the master device 110. These connection parameters may be stored or determined by the portable device 10 prior to, during, or after responding to the advertisements from the master device 110.

At this stage, the two devices may negotiate with each other to authenticate and authorize the initial connection. Step 1008. This negotiation may include transmission of data from the portable device 10 relating to the connection parameters that define the connection schedule for the Bluetooth LE initial connection. In the illustrated embodiment, the negotiation may include mutually authenticating that the devices are who they say they are, and mutually verifying that the devices are authorized to connect. The master device 110 may be authenticated and authorized for use with the portable device 10. The portable device 10 may be authenticated and authorized for use with the vehicle or the master device 110. For example, the portable device 10 may be authenticated and authorized remotely via a key server that is an authority for the master device 110, locally via credentials (e.g., plaintext/binary with encryption [e.g., proprietary, PGP, PKE, symmetric, etc.], certificates, etc.), or any combination thereof (e.g., centralized or distributed trust models). Additionally, authorization may be revoked to discontinue authorized use of a portable device 10 in connection with the communication system 100.

In one embodiment, both the master device 110 and the portable device 10, or the application that runs on the portable device 10, may be configured with data, keys, encryption methods, and decryption methods in memory that allow them to demonstrate their authenticity (identity); to verify the authenticity of the other device; to demonstrate their authorizations (permissions) encrypted by a trusted source; to verify the authorizations (permissions) of the other device; to establish a shared session key; to encrypt messages demonstrating authenticity; and to decrypt messages verifying authenticity. Each of these operations may be performed conventionally with symmetric or asymmetric encryption when the appropriated data, keys, and methods are configured in both devices. After connecting wirelessly, and in negotiating the initial connection, in step 1008, the portable device 10 and the master device 110, over the primary communication link 140, may mutually verify authentications, mutually verify authorizations, establish a shared session key for this connection, encrypt subsequent messages demonstrating the authenticity of the messages, and decrypt subsequent messages verifying authenticity of the messages.

In the illustrated embodiment, after the master device 110 and the portable device 10 have successfully established the initial connection, the master device 110 and the portable device 10 may switch roles to facilitate establishing the primary connection on the primary communication link 140. Step 1010. Again, as mentioned herein, this and related steps may be absent in one or more embodiments, such that the initial connection is utilized as the primary connection.

Switching roles may involve the master device 110 taking on the role of the central device, and the portable device 10 taking on the role of the peripheral device. In this way, the controller 112 in the master device 110 may manage and control the connection schedule so that the connection operations are efficient and optionally optimized for the system performance. The master device 110 may inform the portable device 10 of the connection schedule. In the Bluetooth LE framework, the portable device 10 may start to advertise, and the master device 110 may start to scan. The devices may optionally terminate the initial connection prior to starting the primary connection on the primary communication link 140.

Use of an initial connection, as discussed above, may avoid having the portable device 10 continuously advertising or broadcasting. Instead, after the portable device 10 identifies the master device 110 and negotiates the initial connection with the master device 110, then the portable device 10 may initiate advertising for a response. Step 1014. The master device 110, conversely, may scan for advertisement from the portable device 10. Step 1012. The master device 110 and the portable device 10 may form the primary connection on the primary communication link 140 in this manner. Steps 1016, 1018. The initial connection may include exchange of authentication or verification information that enables a substantially secure transition to the primary connection.

In one embodiment, passing authentication or authorization information from the first or initial connection to the second or primary connection may facilitate an additional layer of security or speed up the authentication process. The authentication and authorization information may include generation of a shared secret key that is established during the initial connection, and verified during the establishment of the primary connection. For instance, the portable device 10 and the master device 110 may conduct authentication based on a hashed message. A variety of alternative authentication schemes may be utilized to secure or authenticate a secure handoff from the initial connection to the primary connection, including, for example, asymmetric key-based systems and shared keys or secrets, or both. An added layer of security may also be achieved by enabling negotiation of the primary connection only while the initial communication connection is active, or within a set period of time after the initial communication connection has been established or terminated. In one embodiment, the initial connection may be kept active to facilitate repeated attempts to establish the primary connection in case a first attempt fails.

It is noted that the authentication and authorization techniques described herein focus primarily on exchange of information within an RF communication technology, such as Bluetooth LE, and securing that information to authenticate the portable device 10 and the master device 110. The protocol for such RF communication technology may utilize one or more additional layers of security, such as encrypted point-to-point communication. Example protocols may include Secure Socket Layer (SSL), transport layer security (TLS), and datagram transport layer security (DTLS). Additionally, or alternatively, communications may be encrypted via an additional layer of security that is not standard to the RF communication technology.

Relay attacks or attempts to compromise security may be guarded against in one embodiment of the present disclosure by changing parameters of the primary communication link 140. For instance, assuming that for trilateration to yield accurate results, the communication system utilizes n connection events per second. The system may further establish m secondary connections as part of the primary communication link 140. In other words, the primary communication link 140 may utilize m communication connections for exchanging information between the portable device 10 and the master device 110. Each of the m secondary connections may communicate n/m connection events per second such that the connection events are distributed among multiple communication channels, obfuscating which channel is used for a connection event at any given time, thereby enhancing security against man-in-the-middle attacks. Relay attacks may also be guarded against by frequently changing connection parameters of the primary communication link 140. Another approach for guarding against relay attacks may include starting and stopping connections, making it problematic to follow the set of connections as a relay. Timestamp data may also be used in conjunction with other information (e.g., the location information) to enhance protection against relay attacks and replay attacks. For instance, the system may establish a valid time window within a known range to check against relay, man in the middle, or replay.

With the primary connection established, the master device 110 may store connection parameters and a connection schedule in memory. Step 1020. In other words, the master device 110 may have full knowledge of the connection parameters and the connection schedule. The connection parameters and connection schedule may relate to communication via one or more primary communication channels, or communication radio bands for transmission or reception, or both of data. The master device 110 may control the connection parameters and connection schedule, or the master device 110 may learn or obtain the connection parameters and the connection schedule from the portable device 10. Alternatively, or additionally, the portable device 10 and the master device 110 may together negotiate the connection parameters and the connection schedule.

The primary communication link 140 between the master device 110 and the portable device 120 may be established in a variety of ways and based on various parameters. For purposes of disclosure, the primary communication link 140 and associated parameters are described in connection with a Bluetooth LE communication link. However, it should be understood that one or more embodiments of the present disclosure are not so limited. For example, the primary communication link 140 may utilize a different type of communication technology. And, as another example, the primary communication link 140 may utilize more, fewer, or variations of the parameters described herein. Aspects of the primary communication link 140, including one or more associated parameters, may be communicated to one or more monitor devices 120. In this way, the one or more monitor devices may be pre-seeded with connection parameters and schedule information of the primary communication link 140 to facilitate monitoring of communications.

Examples of parameters for the communication link in the realm of Bluetooth LE, such as connection parameters and schedule parameters, may include one or more of the parameters outlined in Table 1 below.

Connection status—connection or timed out
Connection interval
Connection sleep clock accuracy
Longest connection event window the central or master device allows for each connection event
Connection frequency hop interval
Connection adaptive frequency hopping channel map
Connection slave latency
Connection supervision time-out period
Connection CRC initialization value
Central and peripheral access addresses, or master device and portable device assess addresses
Connection temporary key
Connection long-term key
Connection parameters utilized to pass information of the connection from one device to another, such as from the master device 110 to the monitor device 120.

Table 1: Example Parameters for Communication Link

By sharing parameters of the primary communication link 140 with the one or more monitor devices 120, the communication system 100 may enable monitoring of messages of the primary communication link 140 and the content within the messages. By knowing this content, and verifying that the message is actually from a portable device 10, a monitor device 120 may be configured to associate particular measurements of signal characteristics with the portable device 10. This association may facilitate providing signal characteristic information to the master device 110, or facilitate use of the signal characteristic information as a basis for determining location information about the portable device 10.

Figure 7:
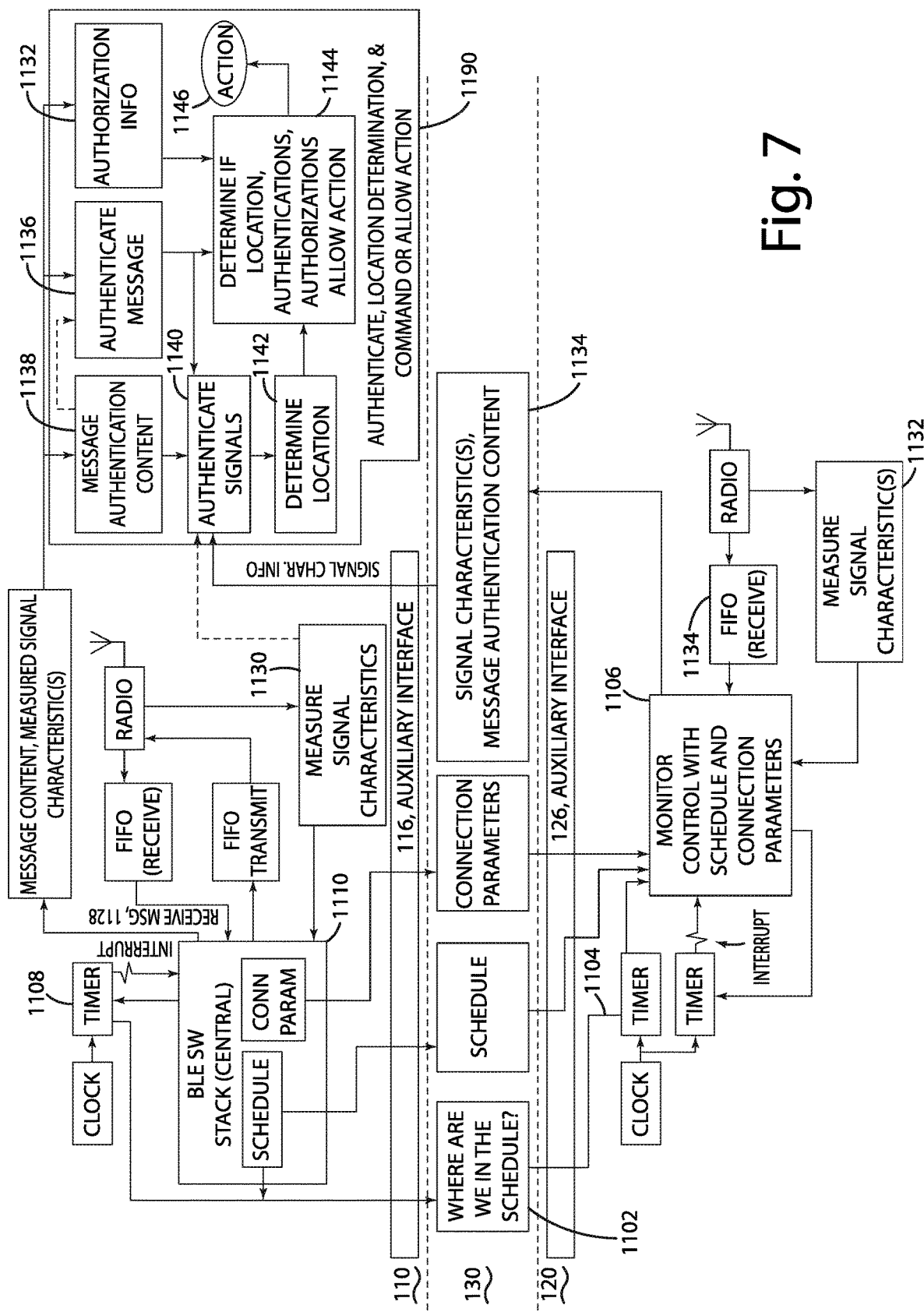
FIG. 7 shows a method of achieving substantial synchronization between the master device and the monitor device, a method of authentication, a method of authorization, and a method of commanding or allowing operations on equipment according to one embodiment.

IV. Monitoring Communication, Determining Location, and Communicating with Equipment Control Turning to the illustrated embodiment of FIG. 7, a method of monitoring communication of a portable device 10 is shown and generally designated 1100. The master device 110 may initiate a real-time location determination by commanding one or more of the monitor devices 120 to enter an operating state to monitor communications of the primary communication link 140. The master device 110 may communicate commands to the monitor devices 120 via the auxiliary communication link 130, and may continuously or intermittently update the one or more monitor devices 120 with connection parameters in a connection schedule specific to the primary communication link 140. Sharing of this information may facilitate sniffing or spying on communications of the primary communication link 140.

More specifically, in one embodiment, the one or more monitor devices 120 may utilize the same schedule that the master device 110 (potentially acting as a Bluetooth LE central device) and the portable device 10 use to communicate via the primary communication link 140. In other words, the master device 110 and the portable device 10 may synchronize operations with respect to communication via the primary communication link 140. Synchronization may be achieved in various ways, depending on the application. In the illustrated embodiment, synchronization may involve the master device 110 exporting its time-base to the one or more monitor devices 120. The knowledge of the precise time may be obtained from a timer 1108 and the scheduling layer of the master device 110. The timer 1108 may generate interrupts to the software radio or software stack 1110 to facilitate appropriate timing of communications to and from the radio. In the illustrated embodiment, the master device 110 may obtain timing information relating to various timing parameters, including, for example, the time from the timer 1108, the schedule from the schedule portion of the software stack 1110, and where the time is in relation to the schedule. This timing information may be provided to the one or more monitor devices 120. Step 1102. In the illustrated embodiment, the timing information may facilitate substantial synchronization to a resolution of 10's of microseconds.

The one or more monitor devices 120 may also implement a scheduling layer that involves obtaining the timing information from the master device 110, and loading this information into a timer of the monitor device 120. Step 1104. Loading of this timing information may enable the monitor device 120 to synchronize with the master device 110. Because there may be a delay, often a fixed delay, in transmission of the timing information via the auxiliary communication link 130, the monitor device 120 may be configured to compensate or null out the delay. The monitor device 120 may utilize the timing information received via the auxiliary communication link 130 to monitor the primary communication link 140 without actively transmitting on the primary communication link 140.

In the illustrated embodiment, a monitor device 120 may receive timing information indicative of a communication window or time window for a particular communication channel. During the communication window, the monitor device 120 may look, monitor, or sniff for communications on the identified communication channel. As discussed herein, the primary communication link 140 may involve communications over more than one communication channel. The timing information may identify to the monitor device 120 which communication channel to monitor for a given time period or window.

The master device 110 or the portable device 10, or a combination thereof, may determine channel and time distribution for communications. It is noted that the more error in time synchronization, the longer and earlier each monitor device 120 may keep its wireless communication interface 124 focused on a communication channel. In other words, there may be a trade-off between time distribution accuracy and the size of the time window that the monitor device 120 may monitor for a given channel. If the time distribution is coarse, the monitor device 120 may utilize larger windows of time for monitoring messages. If there are multiple portable devices 10, and therefore more communication windows associated with the wireless interface 114 of the master device 110, larger windows for communication may constrain the number of channels that the monitor device 120 may monitor with a single radio.

In one embodiment, the master device 110 may be communicating with more than one portable device 10. The timing information may also identify which portable device 10 is associated with each communication window so that the monitor device 120 may track or monitor multiple portable devices 10 with a single radio or communication interface 124. It should be understood that the monitor device 120 is not limited to configurations with a single radio, and that the communication interface 124 may include one or more radio interfaces.

With the timing information received from the master device 110, and the time-base of the monitor device 120 being updated accordingly, the monitor device 120 may monitor the primary communication link 140 between the master device 110 and the portable device 10. Step 1106. The monitor device 120 may sense one or more signal characteristics associated with communication transmissions from the portable device 10. Step 1132. As an example, the portable device 10 may indicate a transmission power associated with its transmissions (or it may be assumed to be a particular value), and by comparing this transmission power against a sensed signal strength, distance information may be determined about the portable device 10 relative to the monitor device 120. This distance information may be determined by the monitor device 120 or the master device 110, or a combination thereof.

The timing information utilized by the monitor device 120 or the time-base of the monitor device, or both, may be supplemented to enhance accuracy based on monitored messages from the master device on the primary communication link 140. For instance, as noted herein, there is a chance that a communication delay in transferring the time-base or timing information of the master device 110 to the monitor device 120 may affect synchronization between the master device 110 and the monitor device 120. The monitor device 120 may compare the timing of messages received (using the timing information and the schedule information) to the time-base of the monitor device 120 to correct for differences in synchronization. In one embodiment, the time-base of a monitor device 120 may be determined entirely using the timing of messages received from a master device 110, a primary communication link 140, or any combination thereof.

With substantial synchronization of the time-base of communications and sharing of the connection schedule, the master device 110 or the monitor device 120, or both, may turn toward determining location and determining whether to command or allow an equipment action. The steps for determining to command or allow an equipment action, based upon location, authentication, and authorizations, are further depicted in FIG. 7 and designated 1190. At step 1128, the master device 110 may receive a message from the portable device 10 over the primary communication link 140. Step 1128. At step 1130, the master device 110 may monitor one or more signal characteristics of the message (e.g., the signal strength of the message) from the portable device 10. As another example, the one or more signal characteristics of the message may be the angle of arrival of the message from the portable device 10.

At step 1132, similar to the master device 110, the monitor device 120 may obtain one or more signal characteristics based on messages from the portable device 10 to the master device 110. The monitor device 120 may also obtain the message contents of the message. Step 1134. The monitor device 120 may determine authentication information based on the message contents, including, for example, the message itself, a cyclic redundancy checksum (CRC), a checksum, a message integrity check field or a secure hash. The authentication information, the one or more obtained signal characteristics, or one or more monitored and computed signal characteristics, or any combination thereof, may form signal characteristic information that the monitor device 120 sends over the auxiliary communication link 130 to the master device 110. Step 1134. With the authentication information being transmitted with the one or more obtained signal characteristics in the signal characteristic information, the master device 110 can authenticate the message that was used as a basis for measuring the one or more obtained signal characteristics. This can facilitate matching of reported measurements from multiple sources, including another monitor device 120 and the master device 110.

The master device 110 may authenticate the message it received over the primary communication link 140 from the portable device 10. Step 1136. As described herein, the content of the message may include information considered specific or perhaps unique to the portable device 10 so that the message can be authenticated as being from the portable device 10 and not a device pretending to be the portable device 10. For example, the message may be encrypted or include identifying information associated with the portable device 10. By authenticating the message at step 1136, the master device 110 may proceed with assurance that the message is from the portable device 10, and optionally that it should follow any instructions contained in the message. Authentication of the message may be based on message content received from the software stack 1110. Additionally, or alternatively, authentication may be based on message authentication content computed at step 1138 based on the message content, as shown in broken lines.

More specific to the computation of message authentication content at step 1138, the master device 110 may determine authentication information based on the message contents received from the software stack 1110. In order to match up the authentication information of the master device 110 with the authentication information received from the monitor device 120, both the master device 110 and the monitor device 120 may use the same algorithm used for determining authentication information, including for example, the message itself, a cyclic redundancy checksum (CRC), a checksum, a message integrity check field or a secure hash. After the master device 110 computes the authentication information, the master device 110 may authenticate that the message authentication contents from step 1138 are valid for the signal characteristic information from step 1134 received from the portable device 10. Step 1140. Such authentication may include determining that the authentication information computed in the master device 110 can be matched to corresponding authentication information transmitted from the monitor device 120, and associating the one or more measured, transmitted signal characteristics from the monitor device 120 with a message authenticated at step 1136. The master device 110 may drop measured or transmitted signal characteristics associated with messages that are not authenticated. In one embodiment, messages transmitted between monitor devices 120 and master devices 110 using the auxiliary communications link 130 may themselves also be encrypted, verified, authenticated, and authorized by the receiver (or a combination thereof), in addition to authenticating and verifying the messages themselves, as described previously.

Based on the one or more signal characteristics received from the monitor device 110, and dependent on such one or more signal characteristics pertaining to an authenticated message, the master device 110 may estimate the location of the portable device 10. Step 1142. The location, preferably microlocation, may be determined based on a variety of types of signal characteristics, including for example, signal strength or time of flight to implement a trilateration- or multilateration-based location determination, angle of departure or angle of arrival to implement triangulation-based location determination, and any of the other signal characteristics described herein, or any combination thereof. In one embodiment, the master device 110 may adjust the estimate of the position of the portable device 10 based upon one or more prior estimates, including prior estimates of at least one of the following: distance, position, signal strength, time of flight, time of arrival, time difference of arrival, angle of departure, angle of arrival, obstacle positions, environment, as well as computational models using: trilateration, multilateration, triangulation, Kalman filters, particle filters, fingerprinting, machine learning, artificial intelligence, geometry, etc.

At step 1132, the master device 110 may examine authorization information, which may be stored in memory and transmitted from the portable device 10. The authorization information may be included in the message content provided from the software stack 1110. As an example, the authorization information may include an identifier particular to the portable device 10. Based on information including at least one of the authorization information determined at step 1132, the location information determined at step 1142, and the authentication information determined at step 1136, the master device 110 may determine if such information is sufficient to allow or command an action on the equipment. Step 1144. The master device 110 may communicate to the equipment control 160 that the portable device 10 location (or set of possible positions with confidences, or its absence), authentications, and authorizations, or any combination thereof, may allow for an action on the equipment. Step 1146. All or some of the steps described in connection with the process 1190, including for example step 1144, may be performed in a device other than the master device 110, such as the equipment control 160.

In one embodiment, the communication system 100 may be configured such that the primary communication link 140 or the auxiliary communication link 130, or both, utilizes wide channel bands. This configuration may enable more precise capture of the time of arrival of monitored messages from the master device 110 on the primary communication link 140, enhancing the accuracy of the time-base updates, allowing the time base to be used for time of arrival measurements.

In one embodiment, the communication system 100 may include multiple master devices 110. Synchronization of the one or more monitor devices 120, the one or more portable devices 10, and the multiple master devices 110 may be achieved in a variety of ways. For example, in a system with multiple master devices 110 or multiple monitor devices 120, or both as shown in the illustrated embodiment of FIG. 1, one or more of these devices may take on the master device 110 role on the auxiliary communication link 130. The role of master device 110 may be passed from device to device as the portable device 10 moves about the system of devices. When the portable device 10 moves within range of the primary communication link 140, the portable device 10, in a central role, may connect to the master device 110 with the strongest signal, the portable device 10 and the master device 110 may switch roles where the master 110 device takes on the central role. The master device 110 may communicate connection parameters and connection schedule to a set of monitor devices 120 over the auxiliary communication link 130, commanding the monitor devices 120 to monitor the portable device 10. The master device 110 and the monitor devices 120 may determine the location of the portable device 10.

The master device 110 may have a data set, stored in memory, identifying the locations of other potential master devices 110 in the vicinity of the master device 110. When the master device 110 determines that the location of the portable device 10 is closer to another master device 110 (optionally with hysteresis), the master device 110 may send the connection parameters and connection schedule to the other master device 110 over the auxiliary communication link 130. The other master device 110 may monitor the connection events between the initial master device 110 and the portable device 10 over the primary communication link 140. The other master device 110 may update its time-base for the schedule using the time of arrival of the messages from the initial master device 110 to the portable device 10 over the primary communication link 140. The other master device 110 may send messages over the auxiliary communication link 130 to the initial master device 110 indicating that it is receiving the messages in the connection events. The initial master device 110 may command its set of monitor devices 120 to stop sniffing the portable device 10. At this stage, the initial master device 100 may stop transmitting as the central role in the connection events. The initial master device 110 may command the other master device 110 to become the master device 110 for the portable device 10. The other master device 110 may use its time-base, the connection parameters and the schedule to transmit and receive in the central role with the portable device 10 during the connection events over the primary communication link 140.

Repeating this sequence, the other master device 110 may communicate connection parameters and connection schedule to a set of monitor devices 120 over the auxiliary communication link 130, commanding the monitor devices 120 to monitor the portable device 10. Again, the other master device 110 and the monitor devices 120 may determine the location of the portable device 10. This sequence may repeat as the portable device 10 moves about the system of devices.

As another example, there may be one active master in the group of master devices 110, and this active master may direct timing for all of the devices in the communication system 100. Synchronization in this example may be similar to the synchronization methodology described in connection with the illustrated embodiment of FIG. 7, but optionally may include transitioning the role of active master in the event a current active master fails.

V. Location Determination

Figure 2:
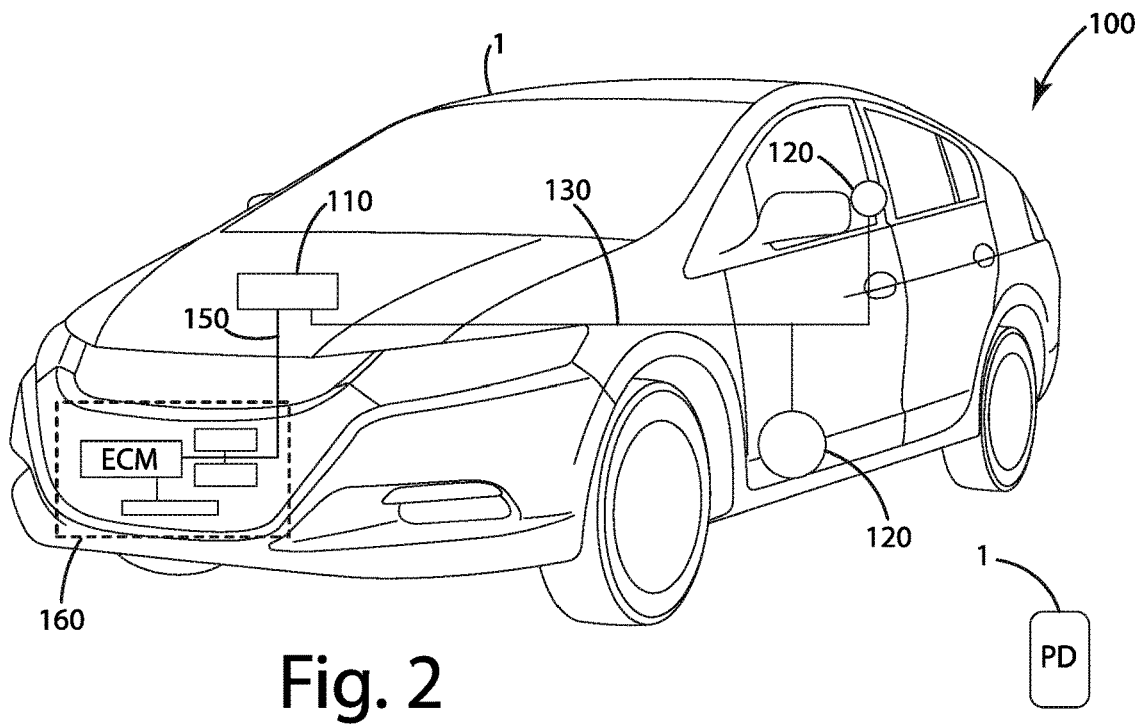
FIG. 2 shows a representative view of the communication system of FIG. 1 incorporated into a vehicle.
Figure 3:
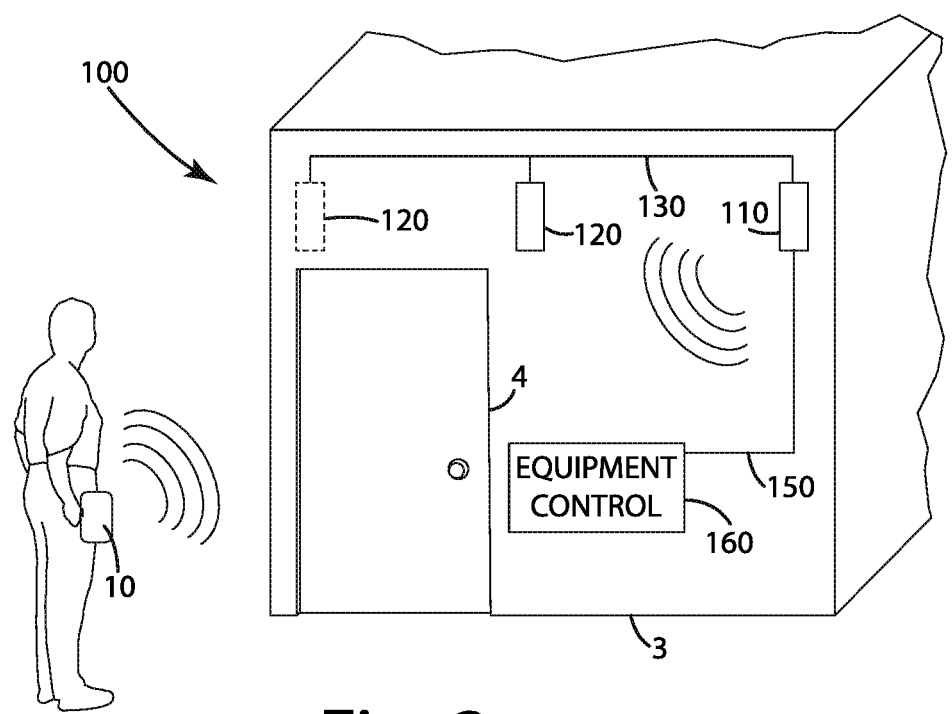
FIG. 3 shows a representative view of the communication system of FIG. 1 disposed on or in proximity to a building.

The monitor device 120 may be fixedly disposed on or in proximity to an object, such as a building, furniture, or vehicle, as depicted in the illustrated embodiments of FIGS. 2 and 3, similar to the master device 110. The monitor device 120 or the master device 110, or both, may store in memory position information regarding the monitor device 120 relative to one or more landmarks or areas of interest. Example landmarks include the location of the master device 110, a door of a building or vehicle, or a specific area within a building or vehicle.

More specifically, in the realm of vehicles, the master device 110 or another device in communication with the master device 110 may store in memory landmark information relating to a location of the master device 110, the one or more monitor devices 120, and landmarks of the vehicle (such as outside of a door, inside the vehicle, a driver seat, the passenger seat, and the backseat), and one or more areas around the vehicle. Example areas around the vehicle may include a first space defined within 3 feet of the driver's door, a second space defined within 5 feet of the vehicle and a third space defined within 20 feet of the vehicle.

The communication system 100 may determine a location of the portable device 10 relative to one or more of these vehicle landmarks, and enable or disable one or more functions relating to the vehicle based on the determined location. For example, if the master device 110 determines the portable device 10 is within the first area, the equipment control 160 may command components of the vehicle to unlock a vehicle door. As another example, if the master device 110 determines the portable device 10 is located in proximity to the vehicle driver seat, the equipment control 160 may command the vehicle to enable mobilization. On the other hand, if the master device 110 determines the portable device 10 is located or moved to a backseat of the vehicle, the equipment control 160 may refrain from enabling mobilization or command the vehicle to disable mobilization. In several cases, the equipment control 160 determines what to do with the information provided to it by a master device 110 via the equipment command interface 150, which may include performing a commanded action, responding with requested information, or updating information, and furthermore, determining whether the command/request is authorized for the particular portable device 10 based upon its identity and/or additional information communicated in the command/request (e.g., a vendor-specific account identifier, access token, etc.); in other words, the master device 110 may provide the equipment control 160 with authenticated commands/requests from one or more authorized portable devices 10 using the equipment command interface 150, along with positioning and other related information about said the one or more authorized portable devices 10, such that the equipment control 160 may determine what actions to take. In one embodiment, the equipment control 160, or subsets thereof, may be logically or physically integrated into the master device 110; in another embodiment, the master device 110, or subsets thereof, may be logically or physically integrated into the equipment control 160. The communication system 100 may be utilized in a similar manner to determine location information relative to one or more landmarks in applications outside the realm of vehicles.

As discussed herein, the communication system 100 may include a master device 110 and one or more monitor devices 120. The master device 110 and the one or more devices 120 may be disposed in fixed locations, and information regarding the fixed locations of these devices may be stored in memory, which may be volatile or persistent. In one embodiment, a device may determine or obtain all or some of the fixed position information at run-time. The device may obtain the fixed position information from another device, such as another device 120, the master device 110, or via an input/output interface (e.g., GPIO) for an external device. The fixed position information obtained or determined at run-time may be stored in RAM or volatile memory. Additionally, or alternatively, only portions of the fixed position information may be stored in volatile memory at any point in time such that the entirety of the fixed position information is not stored in the volatile memory at the same time. In this way, the fixed position information may be processed on the fly or during run-time without the entirety of the fixed position information being stored in memory.

In one embodiment, one or more fixed position devices may communicate position information to one or more other fixed position devices so that this communicated position information can be stored in memory. As an example, the master device 110 may communicate position information about itself and/or other fixed position devices to a monitor device 120, periodically, or during power-up, or at any other time of operation, or any combination thereof.

The master device 110 may store in memory location information with respect to itself and each of the one or more monitor devices 120. As another example, the master device 110 may store in memory location information with respect to itself, and each of the respective one or more monitor devices 120 may store in memory their location information and share this information with the master device 110 via the auxiliary communication interface 130. Based on this location information and detected signal characteristic information with respect to communications from the portable device 10, the communication system 100 may determine location information about the portable device 10. The location information about the portable device 10 may include a location of the portable device 10 corresponding to one or more zones/areas relative to an object, or a distance from one or more landmarks (e.g., a specific point of an object or one of the fixed position devices).

In one embodiment, the communication system 100 may include at least three devices disposed at known locations, including the master device 110 and at least two monitor devices 120. With three devices, the master device 110 may utilize trilateration to resolve the position of the portable device 10 to two possible locations. With four or more devices, the master device 110 may utilize trilateration to resolve the position of the portable device to a single possible location. In this way, the master device 110 may determine a position of the portable device 10 in real-time with enhanced accuracy over conventional location detection systems that utilize only point-to-point signal strength as an indicator of distance. In one embodiment, the communication system may include at least seven fixed position devices, including at least one master device 110 and at least one monitor device 120.

It should be understood that trilateration is not the only method of determining location of a portable device 10 based on signal characteristic information. Other position methodologies for determining location information based on this information include methodologies utilizing angle of arrival, angle of departure, time of flight, time of arrival, time difference of arrival, transmit power (in addition to receive power), differentials, etc., such as triangulation, multilateration, differential, fingerprinting, Kalman filters, particle filters, machine learning, artificial intelligence, etc., and any combination thereof. Further, it should be understood that it is not necessary to utilize three or more fixed position devices to determine location information about the portable device 10, and that more or fewer fixed position devices may be utilized in determining the location information, with varying degrees of accuracy.

In the illustrated embodiment, the master device 110 and the one or more monitor devices 120 are disposed in an asymmetric arrangement about the object, such as the vehicle. For instance, the master device 110 may be disposed near the center of the vehicle, and the one or more monitor devices 120 may be disposed such that a monitor device 120 is located inside the driver door, but not the passenger door. Asymmetric arrangements may enable targeting of specific areas of interest, and may facilitate overcoming potential interference caused by the vehicle or inherent to the vehicle, or a combination thereof. Alternatively, the master device 110 and the one or more monitor devices 120 may be positioned on the object in a symmetric arrangement. Symmetric arrangements may decrease computational complexity in determining the location of the portable device 10 relative to the object, primarily because calibration of fixed position device locations, signal strengths, distances, angles, or any combination thereof, are likely more uniform in a symmetric arrangement.

Several embodiments described herein utilize stored information about the position of each of the fixed position devices, including the master device 110 and the one or more monitor devices 120. This information may be obtained in a variety of ways, including, for example, a configuration or calibration process in which a location of each fixed position is determined and stored in memory. The configuration process may involve storing in each device an identifier indicating its fixed position relative to a landmark or object whose location is known during the configuration process. In some cases, the location of one or more fixed position devices, or all of the fixed position devices, may be unknown. The locations of one or more fixed position devices in this circumstance may be determined in the configuration process. For example, in one configuration process, identification of the unknown locations may be facilitated by temporary introduction of one or more additional fixed devices whose actual position is known and can be used as a basis for determining the unknown locations. Based on the location of the one or more fixed devices relative to each other, the system 100 may calibrate to adjust one or more parameters, such as transmit signal strength, antenna mode, antenna type, the location algorithm including parameters of the algorithm, or a combination thereof. Example changes in the location algorithm may include adjustment of a performance factor or metric. The adjustments may be conducted in real time or at the time of initial calibration.

An example of a real-time calibration includes obtaining knowledge about behavioral/known patterns of usage, including, for example, knowledge about the location of the portable device 10 when a user opens the door, or that a user nearly always places their portable device 10 in the same location (e.g., placement of a purse on the passenger seat once in the car). Such knowledge may be used as a basis for calibrating the system 100 to more accurately determine location information, including adjusting the location algorithm in use (e.g., curve fitting or compensation).

As another example, the location of each fixed position device may be determined using knowledge about the location of one fixed position device, and instructing each of the other fixed position devices to transmit communication and to listen for communications respectively. Fixed position devices, when not transmitting communications, may detect signal characteristic information for the fixed position device transmitting. As a result, each fixed position device may collect signal characteristic information for each of the other fixed position devices. The collection of signal characteristic information for all of the fixed position devices may be used in conjunction with the one known position to determine position information about all of the known fixed position devices. This position information may be stored in memory.

In one embodiment, the portable device 10 may include one or more sensors for determining motion information and/or position and/or orientation information, or any combination, for the portable device. These sensors may include at least one or more of the following: an angular rate sensor, a magnetometer, an accelerometer, an ultrasonic speaker/microphone, and a Global Positioning System (GPS) receiver. The master device 110 or the monitor device 120 may also include a set of sensors for determining motion information or positioning information, or both.

The one or more sensors incorporated into the master device 110 or the monitor device 120, or both, may include at least one or more of the following: an angular rate sensors, magnetometers, accelerometers, ultrasonic speakers/microphones, GPS receivers, speedometers, and odometers. Additionally, or alternatively, one or more of these or similar sensors may be external to the master device 110 or the monitor device 120, but communicatively coupled thereto, such that the master device 110 or the monitor device 120 may receive sensor information from the external sensors. As an example, the equipment control 160 may include the one or more sensors, and the master device 110 may receive sensor information from the sensors via the command interface 150 with the equipment control 120.

Additionally, or alternatively, the master device 110 may know or determine the motion and/or position and/or orientation information, or any combination, of the equipment to which the master device 110 is affixed based upon the operational state of the equipment, which the master device 110 may receive over the equipment command interface 150. For example, the equipment may be a vehicle, and the vehicle may be in park, or off. The master device 110 may obtain status information indicating the park or off condition from the equipment control 160 via the equipment command interface 150. As another example, the master device may know or determine the motion and/or position and/or orientation information based upon the operational characteristics of the equipment. In the context of the equipment being a building at a known location, the portable device 10 may transmit its motion and position information over the primary communication link 140 to the master device 110. The master device 110 may use any combination of Kalman filtering, particle filtering, fingerprinting, trilateration, triangulation, multilateration, differential, machine learning, artificial intelligence, and other techniques to integrate or determine a) the motion and/or position and/or orientation information from the portable device, b) the motion and/or position information of the equipment, c) the relative position of the portable device 10 to the master device 110 as estimated by trilateration and/or multilateration of distances, or d) the relative position of the portable device 10 to the master device 110 as estimated by triangulation of angles, or any combination thereof. The system may compensate for variations in the antenna characteristics of the portable device 10, the master device 120, and the monitor devices 120, based upon estimates of their relative positions and/or orientations. Integrated information determined according to one or more of these techniques may provide a more accurate estimate of the relative position of the portable device 10 to the master device 110. Based upon computed positions of the portable device 10 over time, historical portable device 10 movement vectors may be determined and future movement vectors estimated, from which portable device 10 positioning estimates may be checked (validating, increasing or decreasing confidence, or invalidating) and movement may be analyzed and/or predicted.

The master device 110 may also use a Kalman filter, a particle filter, a fingerprinting, or a machine learning technique, artificial intelligence, or any combination thereof, on the integrated motion, position, trilateration, triangulation, multilateration, differential, time of flight, and/or other information. Such filter techniques may provide protection against relay attacks. For instance, a Kalman filter or particle filter, or both, may be utilized to detect that the motion and/or position information transmitted by the portable device 10 is not consistent with the trilateration, multilateration, differential, or triangulation information, and in response to such detection, the master device 110 may determine that the information is inconsistent and that the location is not valid (or has very low confidence). This scenario may occur when the portable device 10 is stationary, and a relay attacker is approaching the equipment with motion. Additionally, motion information may be a control input to a Kalman filter.

In one embodiment, the master device 110 may be configured to account for fading effects, including, for example, a) adjusting one or more parameters (e.g., switching to a different channel, applying an offset or dynamic configuration parameter, etc.) to substantially avoid or mitigate fading effects and/or b) using the fading effects as a fingerprint or indication with respect to a location of the portable device 10. In a narrow band system like Bluetooth LE, multipath reflections may induce fading or other effects in the one or more signal characteristics that can affect accuracy of the location determination.

To mitigate such effects, in one example, the master device 110 may combine measurements across several channels (e.g., greater than 20 channels). An additional approach to mitigate fading effects includes: scheduling connection events at 20 or 40 Hz, measuring portable device signal strength at each connection event (which is at a specific channel), optionally taking multiple measurements (e.g., two or more packets per connection event), and combining the measurements with a maximizing, averaging, clustering, or median-finding filter, or any combination thereof. The next connection event may be on a different channel (in accordance with the BLE specification). Further possible approaches that can be used alone or in conjunction with this additional approach or another approach include: a) maximizing, averaging, or median-finding the connection events—e.g., using an averaging time-window filter that collects the previous 0.5 to 2 seconds of connection events on different channels, and averaging the outputs of the filters; b) averaging the connection events using an exponential moving average with a time constant on the order of 0.5 to 1 second, and collecting connection events from different channels into the average; c) collecting groups of 3 to 5 connection events, discarding the lower 1 to 3 signal strengths as likely faded and then using the averaging methods of approaches a) or b), or both; d) running a particle filter on the raw data; e) running a Kalman filter on the raw data; or f) any combination thereof.

In one embodiment, the location of the portable device 10 may be determined via an algorithmic process that is determined based on an operating mode. The determination of the algorithmic process may include selecting at least one of a trilateration, multilateration, triangulation, differential, fingerprinting, machine learning, artificial intelligence, or any other, algorithm. The operating mode, used as a basis for the selection, may be based on at least one of a) whether the portable device 10 is determined to be outside or inside a first distance range of the object and b) whether the portable device 10 is determined to be outside or inside a cabin of the vehicle (or building, room, zone, etc.), c) object status, d) candidate portable device 10 locations, and e) certainty (probabilistically) of location determination. In one or more embodiments, any number of one or more algorithmic processes may be executed concurrently, combining and/or selecting the algorithm resulting in the highest confidence (or a particular algorithm, or combination of particular algorithms, in the absence of confidence) to determine a position of the portable device 10.

Figure 8:
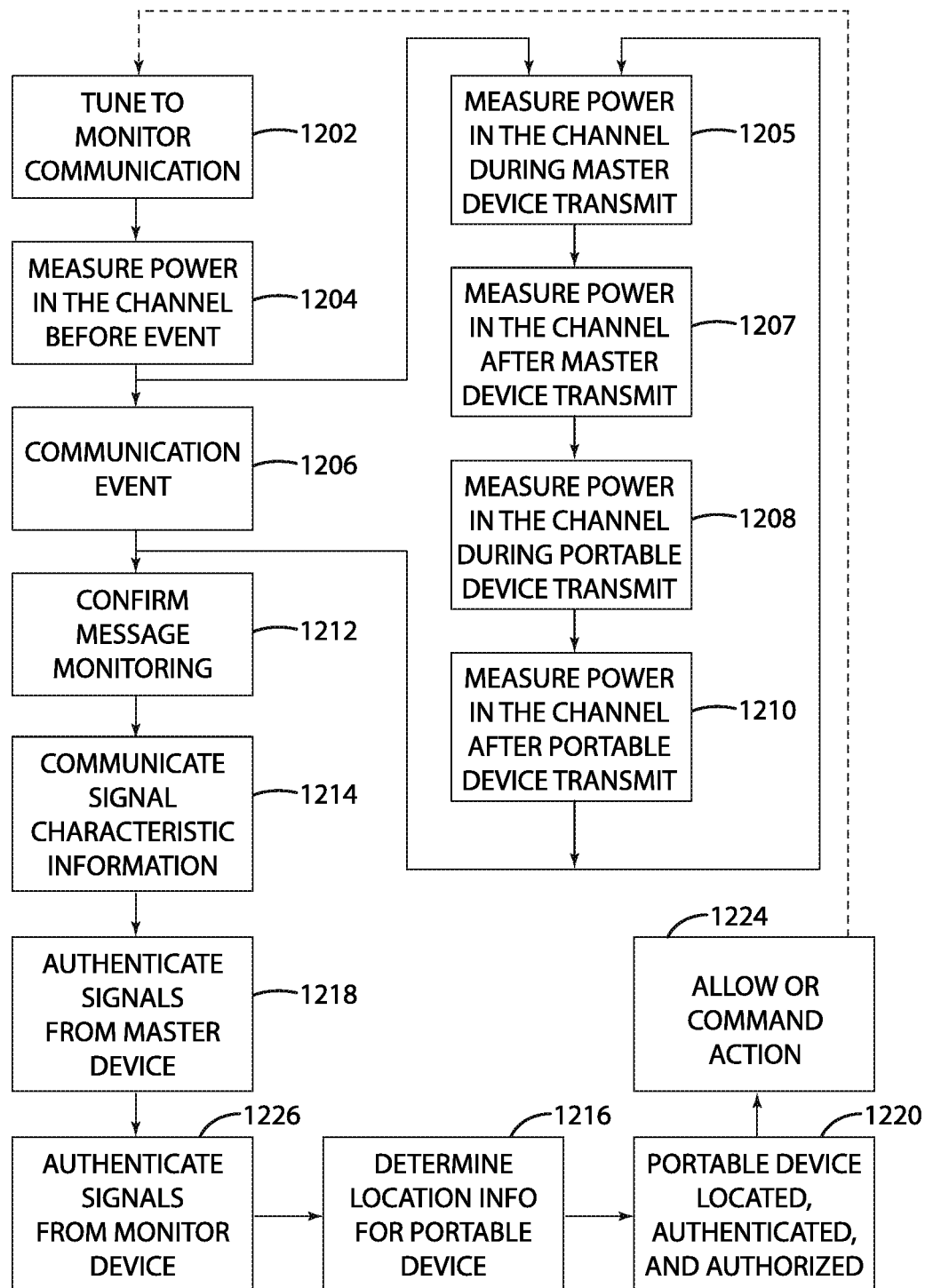
FIG. 8 shows a method of determining location information about a portable device according to one embodiment.

Turning to the illustrated embodiment of FIG. 8, a method of determining location information about a portable device 10 is shown and generally designated 1200. The method 1200 may be based on communications over the primary communication link 140 that are monitored by one or more monitor devices 120. Such communications may be monitored according to one or more embodiments described herein, including monitoring of communications or messages according to the illustrated embodiment of FIG. 7. Parameters and timing of communications associated with the primary communication link 140 may be provided from the master device 110 to the one or more monitor devices 120 via the auxiliary communication link 130 to facilitate monitoring of the primary communication link 140.

In the illustrated embodiment of FIG. 8, the one or more monitor devices 120 may enable and turn their respective wireless communication interfaces 124 to monitor the primary communication link 140 based on the timing information or schedule information, or both, received from the master device 110. Step 1202. Tuning for monitoring may be conducted prior to a scheduled time for communications or prior to a connection event on the primary communication link 140. In this way, the monitor device 110 may configure itself to monitor communications on the primary communication link 140 prior to one or more scheduled events, such as a scheduled message or connection event. The connection event may involve several respective transmissions from the master device 110 and the portable device 10. Step 1206. The monitor device 110 by tuning to monitor such communications prior to the connection event may capture the full exchange between the master device 110 and the portable device 10, or a substantial portion of the exchange.

The one or more monitor devices 120 may conduct one or more measurements to determine signal characteristic information relating to the primary communication link 140 and transmissions from the portable device 10. Steps 1204, 1205, 1207, 1208, 1209 and 1210. More specifically, prior to a connection event, during the master device transmissions, after master device transmissions, during portable device transmissions, after portable device transmissions, or after a connection event, or a combination thereof, the one or more monitor devices 120 may measure power in the channel being utilized by the primary indication link 140 for a scheduled time frame. Alternatively, or additionally, the master device 110 may conduct one or more similar measurements of power in the channel at various times.

In conjunction with the one or more measurements, the monitor device 120 may conduct analysis of the communications received via the primary communication link 140 to verify that the messages being monitored and the one or more measurements correspond to communication between the master device 110 and the portable device 10. Step 1212 or Step 1114. This way, the monitor device 120 may confirm that it has correctly monitored power in the primary communication link 140 or messages exchanged with the portable device 10. For instance, the monitor device 120 may conduct one or more of the following steps for confirmation: verification of Bluetooth LE access addresses, verification of cyclic redundancy checks (CRCs), verification of secure hashes of messages, valid decryption, and timing of messages. The monitor device may send the confirmation information or a summary of the confirmation information to the master device 110. Step 1226 or step 1134. The master device 110 may determine if the monitor device 120 confirmation information is valid if the information should be used to contribute towards a positive decision that the portable device 10 is at a location. The master device 110 may do this by decrypting the messages the master device received from the portable device 10, step 1218 or step 1138, verifying the authenticity of the messages, and then, step 1226 or step 1140, verifying that the confirmation information matches the messages. These steps may enhance protection against adversaries spoofing the location of a portable device 10. Step 1216 or step 1144. The master device 110 may use the confirmation information, as well as received signal characteristics from the monitor devices 120, to determine if there is sufficient information to determine that the portable device 10 is at a location. Step 1220 or 1144. The master device 110 may determine if the portable device 10 is appropriately located, and/or appropriately authenticated, and/or appropriately authorized to allow or command an action on the equipment. For instance, a portable device 10 may be authenticated or known to the master device 110 but not authorized to effect actions via the master device 110. In this case, the master device 110 may disregard commands from the unauthorized portable device. At step 1224 or 1146, based upon step 1220 or 1144, the master device 110 may communicate over the command interface 150 to the equipment control 160 the current portable device 10 position and related information, along with any portable device 10 or master device 110 initiated commands/requests, from which the equipment may choose to perform a particular action.

The one or more monitor devices 120 may communicate a variety of information relating to the primary communication link 140 to the master device 110. Such communication may be transmitted via the auxiliary communication link 130 or a private communication link between the one or more monitor devices 120 and the master device 110. (Step 1134 in the illustrated embodiment of FIG. 7.) For instance, the one or more monitor devices 120 may communicate signal characteristic information based on the one or more measurements that correspond to the communication event. Step 1214 or Step 1134. Additionally, or alternatively, the one or more monitor devices 120 may communicate one or more of the following types of information to the master device 110: monitored communication or message-related information, status information, and a method identifier of the messages (e.g., a hash) captured to enhance security and to demonstrate measurements associated with the correct messages. The hash may be a CRC, or any other identifier, checksum or security feature utilized by the communications protocol to authenticate a message (e.g., a message authentication code or a digital signature). For example, with Bluetooth LE, the message identifier may be a 32-bit message integrity check field. Alternatively, the method identifier may be computed using methods not standard to the communications protocol, including, for example, a separate hash of the message salted with some additional entropy, such as a shared (symmetric) or a public/private (asymmetric) key. In one embodiment, the signal characteristic information may include one or more measured values of power in the primary communication link 140. Alternatively, or additionally, the monitor device 120 may calculate a received signal strength indicator (RSSI) based on the one or more measured values, and include the RSSI in the signal information transmitted to the master device 110. Alternatively, or additionally, the monitor device 120 may calculate an angle of arrival based on the one or more measured values, and include the angle of arrival in the signal information transmitted to the master device 110. The monitor device 120 may further communicate message related information such as the time of arrival associated with the monitored message. It should be understood that the communicated information is not limited to the above message information and signal characteristics; additional or alternative information may be communicated based on any combination of the calculations described herein.

It should be understood that in addition to, or alternative to, communication of signal characteristic information from the one or more monitor devices 120, the portable device 10 may communicate signal characteristic information. For instance, the portable device 10 may communicate RSSI to the master device 110.

In one embodiment, the one or more monitor devices 120 and the master device 110 may communicate with each other via the auxiliary communication link 130 in a manner that substantially enhances security with respect to the communications. For instance, transmissions from a monitor device 120 may be validated by the master device 110 as being from a known monitor device 120. The master device 110 and the monitor device 120 may conduct a challenge/response protocol to achieve such validation.

As discussed herein, the master device 110 may determine, based on the signal characteristic information received from the one or more monitor devices 120, location information with respect to the portable device 10. In the illustrated embodiment, the master device 110 may utilize any of the previously mentioned techniques to determine the location information. Step 1216 or Step 1142.

For instance, the controller 112 in the master device 110 may apply an averaging filter (e.g., a window filter, exponential moving average filter, maximizing filter, median-finding filter or other averaging filter, etc.) on each stream of signal characteristic information (e.g., including signal strength information) received from the monitor devices 120. The controller 112 may estimate the ranges (R) between the monitor devices 120 and the portable devices 10 using the averaged received power ($P_r$) at each monitor device 120 and the Friis equation: $P_r = P_t + G_t + G_r + 20 \log(\lambda/4\pi R)$. Where $P_t$ is portable device 10 transmit power, retrieved from memory; $G_t$ is portable device 10 antenna gain, retrieved from memory; $G_r$ is monitor device 120 antenna gain, retrieved from memory; and $\lambda$ is the primary communication link 140 frequency, retrieved from memory. The controller 112 may use the estimate of the ranges (R) between the monitor devices 120 and the portable devices 10 as well as the positions of the monitor devices 120, retrieved from memory, to estimate the position of the portable device 10 using a non-linear least squares trilateration algorithm, multilateration algorithm, or other algorithms. After the master device 110 has determined the location information, the process may be optionally repeated by starting with tuning for communications. Step 1202.

A variety of locating techniques may be utilized to determine the location information, including techniques that may or may not utilize compensation information to accommodate various factors, such as differently configured antenna configurations and potential obstructions (e.g., a car mirror, a car door, or a metal barrier). In one embodiment, the master device 110 may determine location information with respect to the portable device 10 relative to the master device 110 and the one or more monitor devices 120 based on a) the transmit power of the portable device 10, b) the measured received power by each of the monitor devices 120 and the master device 110, and c) the relative locations of the monitor devices 120 and the master device 110. Based on this information, the location information may be an estimate of the position of the portable device 10 relative to the master device 110.

In one embodiment, the location information may be based at least in part on determination of a Link Quality Indicator (LQI). By measuring power in a communication channel before a connection event (e.g., a transmission), during the connection event, and after the connection event, the master device 110 may calculate a signal to noise ratio, which is considered to be a form of LQI. With this LQI information, the master device 110 may enhance its estimate of the ranges between the portable device 10 and the fixed monitor devices 120 (e.g., the master device 110 and the one or more monitor devices 120).

More specifically, by measuring the power before a portable device 10 transmits a message, during the transmission, and after the transmission, the communication system 100 may identify when spurious transmitters are active in each channel, accounting for the additional power in the transmission from the portable device 10 due to such spurious transmitters. By compensating for the spurious transmissions, the master device 110 may achieve enhanced location accuracy with respect to the portable device 10. The measurements may be conducted with respect to one or more transmissions from the portable device 10 over the primary communication link 140, or with respect to one or more transmission from the master device 110 over the primary communication link 140, or a combination thereof.

It should be understood that the signal characteristic information provided by the monitor device 110 is not limited to measurements of only power in the primary communication link 140 during particular times associated with the connection event. Additional or alternative measurements may be conducted by a fixed position device, including, for example, a noise floor and a rate at which other transmitters are colliding with transmissions associated with the primary communication link 140.

In one embodiment, the variety of information sensed from the fixed position devices (e.g., the master device 110 and one or more monitor devices 120) may be used as a basis for determining changes in position of objects that affect RF transmissions on and around the object or equipment (e.g., a vehicle or building) to which the fixed devices are associated. For instance, opening and closing of a door, or other large objects that come into proximity to the equipment may affect RF transmissions. Monitoring one or more signal characteristics related to such changes may enable profiling of the resultant effects, and therefore enable the master device 110 to compensate accordingly, thereby maintaining substantial accuracy in determining location information for the portable device 10.

In some cases, environmental effects due to presence or movement of objects that affect RF transmissions may be common to a particular configuration. As an example, a communication system 100 incorporated into a vehicle may often encounter movement of a car door between two positions, fully open and fully closed. Calibration and compensation to account for the various positions of the car door, including the different effects on RF transmissions, may facilitate more accurate determinations of location information with respect to the portable device 10. In other words, information related to the effects of external objects on RF transmissions may be used to fine tune estimates of position of the portable device 10.

Although compensation information may be utilized in determining location of a portable device 10 based on detected signal characteristic information, it is noted that in some circumstances, the effect of external objects on the determination may be substantially negated by the communication system 100, itself. For instance, because the fixed position devices may be monitoring substantially the same communications at substantially the same time, system noise may affect the measurements in substantially the same manner, such that, for example, trilateration or multilateration based on the detected signal characteristic information may yield substantially accurate results.

In one embodiment, the master device 110 may direct the one or more monitor devices 120 to conduct measurements of communications during a first, short term connection, step 1006 in the illustrated embodiment of FIG. 6, to determine the location of the portable device 10 quickly and may use the location information as a gate to determine if the portable device 10 is authorized based upon its location. Alternatively, or additionally, the master device 110 may provide direction to conduct measurements of communications during the longer term connections, step 1016 in the illustrated embodiment of FIG. 6. Again, the master device 110 may use the location information as a gate (e.g., acceptance criterion) to determine if the portable device 10 is authorized based upon its location.

It is noted that, for purposes of disclosure, the one or more monitor devices 120 are described as being capable of monitoring or sensing power in a communication channel of the primary communication link 140, and that this sensed information may be used as a basis for determining location information about the portable device 10. The present disclosure, however, is not so limited. For instance, the monitor device 120 may scan for the RF transmissions that occur during a connection event without knowing connection parameters, and communicate sensed information, such as encrypted messages, signal strength or latency information, that may be used as a basis for a location determination. As another example, the monitor device 120 may include a communication interface 124 configured to monitor signals without decoding the underlying information. The communication interface 124 in this configuration may not include a Bluetooth LE chipset, or an RF communication chipset, and may be configured to monitor for one or more RF characteristics.

It should be further noted that, although avoiding multiple communication links between the portable device 10 and multiple fixed position devices may conserve resources in the portable device 10, the present disclosure is not limited to the portable device 10 establishing a single communication link. That is, the portable device 10, according to one embodiment, may establish a plurality of respective communication links with a plurality of fixed position devices. In one embodiment, a master device 110 is present on the exterior of a vehicle, and a second master device 110 is present on the interior of a vehicle, and one or more monitor devices 120 are present on or in the vehicle, where the portable device 10 establishes a primary communications link 140 with both master devices 110, and the one or more monitor devices 120 sniff both primary communications links. Based on these communication links, including one or more signal characteristics of the communication links, the system 100 may determine location information about the portable device 10 relative to the fixed position devices.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A system for establishing location information in real-time, the system comprising:
   a plurality of fixed position devices, each of the fixed position devices configured to communicate via an auxiliary communication link with at least one other of the plurality of fixed position devices, wherein fixed position information about each of the fixed position devices is stored in memory;
   a portable device configured to communicate wirelessly via a primary communication link with a first one of the fixed position devices, wherein a second one of the fixed position devices is configured to monitor communication over the primary communication link between the first one of the fixed position devices and the portable device, wherein the second one of the fixed position devices determines one or more signal characteristics pertaining to the monitored communication and communicates signal information relating to the one or more signal characteristics, via the auxiliary communication link, to the at least one other of the fixed position devices;
   wherein the first one of the fixed position devices communicates radio channel information over the auxiliary communication link to the second one of the fixed position devices to enable the second one of the fixed position devices to monitor communications of the primary communication link, wherein the primary communication link and the auxiliary communication link are separate such that the primary communication link is substantially free from interference from communications transmitted via the auxiliary communication link; and
   wherein location information about the portable device is determined based on the signal information relating to the one or more signal characteristics communicated over the auxiliary communication link.

2. The system of claim 1 wherein the first one of the fixed position devices is operable to direct the second one of the fixed position devices to transition from a low-power state to an operating state in which the second one of the fixed position devices is configured to monitor communications of the primary communication link.

3. The system of claim 1 wherein at least one of the fixed position devices is configured to authenticate and/or authorize an identity of the portable device, and wherein the determined location information is deemed valid if the identity of the portable device is authenticated and/or authorized.

4. The system of claim 1 wherein the location information is communicated to an equipment control, wherein the equipment control is adapted to at least one of a) monitoring a location of the portable device and b) commanding and/or enabling an equipment operation based on the location information.

5. The system of claim 1 wherein:
the first one of the fixed position devices is a master device;
the master device stores in memory one or more signal characteristics to be used as a basis for determining location of the portable device, wherein the one or more signal characteristics are determined based on communication over the primary communication link between the master device and the portable device;
the second one of the fixed position devices is a monitor device configured to sniff communication between the master device and the portable device to determine the one or more signal characteristics; and
the master device is configured to determine the location information about the portable device relative to the master device and the monitor devices based on a) the stored one or more signal characteristics of the portable device and b) the one or more signal characteristics determined by the monitor devices from the sniffed communication.

6. The system of claim 5 wherein the master device communicates the radio channel information and schedule information over the auxiliary communication link to the monitor devices to enable sniffing of communication over the primary communication link.

7. The system of claim 1 wherein the auxiliary communication link is established using Bluetooth Low Energy hardware between the first one of the fixed position devices and the second one of the fixed position devices.

8. The system of claim 1 wherein a communication protocol of the primary communication link is Bluetooth Low Energy.

9. The system of claim 1 wherein the portable device is configured to measure one or more device-side signal characteristics for communications transmitted and/or received by the portable device, the portable device communicating the one or more device-side signal characteristics to the first one of the fixed position devices, wherein at least one of the plurality of fixed position devices is configured to dynamically calibrate based on the one or more device-side signal characteristics.

10. The system of claim 9 wherein dynamic calibration includes at least one of a) adjusting the one or more determined signal characteristics and b) adjusting the algorithm used to determine location.

11. The system of claim 9 wherein the one or more device-side signal characteristics pertain to at least one of a) communications over the primary communication link, b) a change in a state of the portable device, and c) sensor data from one or more device sensors.

12. The system of claim 1 wherein the portable device is configured to change its behavior and/or a content of communications over the primary communication link, wherein the portable device is configured to change its behavior and/or the content based on information provided by the first one of the fixed position devices.

13. The system of claim 12 wherein the information that forms a basis for changing the content includes at least one of a) a next channel on which to communicate, b) correlating information, and c) a command.

14. The system of claim 1 wherein the primary communication link and the auxiliary communication link are Bluetooth communication links.

15. A device for establishing real-time location information about a portable device, the device comprising:
a first communication interface operable to receive wireless communication transmissions from the portable device, the first communication interface configured to obtain one or more device signal characteristics relating to the wireless communication transmissions received by the device from the portable device;
a second communication interface configured for communications with at least one fixed position device separate from the device, the communications including one or more communicated signal characteristics of wireless communication transmissions received by the at least one fixed position device from the portable device, wherein radio channel information is transmitted to the at least one fixed position device via the second communication interface, wherein the radio channel information pertains to the wireless communication transmissions received by the first communication interface from the portable device such that the radio channel information enables the at least one fixed position device to monitor the wireless communication transmissions from the portable device;
wherein communications via the first communication interface are substantially free from interference by communications via the second communication interface;
a controller operably coupled to the first communication interface and the second communication interface; and
wherein location information about the portable device is determined based on the one or more communicated signal characteristics.

16. The device of claim 15 wherein the controller is operable to direct the at least one fixed position device to transition from a low-power state to an operating state in which the at least one fixed position device is configured to monitor the wireless communication transmissions from the portable device.

17. The device of claim 15 wherein an identity of the portable device is authenticated and/or authorized, and wherein the determined location information is deemed valid if the identity of the portable device is authenticated and/or authorized.

18. The device as claimed in claim 15 wherein:
the controller is configured to determine one or more auxiliary signal characteristics with respect to communications provided via the second communication interface;
the device is configured to measure the one or more auxiliary signal characteristics based on the communications provided via the second communication interface, wherein the device is configured to communicate the one or more auxiliary signal characteristics to another device via the second communication interface, and wherein the one or more communicated signal characteristics are based at least in part on the one or more auxiliary signal characteristics; and the one or more auxiliary signal characteristics are one or more received signal characteristics of communications provided via the second communication interface, and wherein the one or more received signal characteristics include an RSSI of communications received via the second communication interface.

19. The device as claimed in claim 15 wherein the second communication interface includes auxiliary communication circuitry, and wherein the first communication interface includes primary communication circuitry, wherein the auxiliary communication circuitry and the primary communication circuitry are substantially the same such that the first and second communication interfaces use the same type of hardware protocol, and wherein the communications via the first communication interface are separate from the communications via the second communication interface such that portable device operation is substantially unaffected by the communications via the second communication interface.

20. The device as claimed in claim 15 comprising an equipment operation interface configured to communicate with an equipment control that controls operation of equipment, wherein the device is fixedly disposed in relation to the equipment, wherein an equipment operation is at least one of enabled and/or commanded based on the location information.

21. The device as claimed in claim 20 wherein the enabled and/or commanded equipment operation is determined based on authentication and/or authorization of the portable device.

22. The device as claimed in claim 15 wherein:
the at least one fixed position device separate from the device includes a master device configured to communicate with the portable device via the first communication interface;
the device is a monitor device that sniffs communication between the portable device and the master device, wherein communications are sniffed via the first communication interface;
the one or more device signal characteristics are based on communications sniffed from the first communication interface; and
the controller communicates, via the second communication interface, the one or more communicated signal characteristics based on the one or more device signal characteristics.

23. The device of claim 15 wherein the communications via the first communication interface and the communications via the second communication interface are Bluetooth communications.

24. A method of determining a location of a portable device in real-time, the method comprising:
receiving, in a master device, wireless communications from a portable device via a wireless communication link;
directing at least one fixed position device to monitor the wireless communications from the portable device to the master device;
transmitting, to the at least one fixed position device, radio channel information pertaining to the wireless communication link to enable the at least one fixed position device to monitor the wireless communications transmitted from the portable device via the wireless communication link;
receiving, via an auxiliary communication link separate from the wireless communication link, one or more signal characteristics based on the wireless communication monitored by the fixed position device, wherein wireless communications transmitted via the wireless communication link are substantially free from interference by communications transmitted via the auxiliary communication link;
obtaining position information relating to a position of the fixed position device; and
determining a location of the portable device based on the one or more signal characteristics and the position information.

25. The method of claim 24 comprising directing the at least one fixed position device to transition from a low-power state to an operating state in which the at least one fixed position device is configured to monitor wireless communications transmitted from the portable device.

26. The method of claim 24 comprising:
authenticating and/or authorizing an identity of the portable device; and
deeming valid the one or more signal characteristics based on the identity of the portable device being authenticated and/or authorized.

27. The method of claim 24 comprising enabling and/or commanding an equipment operation based on the determined location.

28. The method of claim 27 wherein the enabling and/or commanding the equipment operation includes enabling and/or commanding the equipment operation based on authentication and/or authorization of the portable device.

29. The method of claim 24 wherein:
the one or more signal characteristics include at least one of received signal strength, received time of arrival, received time difference of arrival, and received angle of arrival; and
the determining the location includes determining the location based on one or more of a) a heuristic analysis of the one or more signal characteristics and the position information and b) a fingerprinting analysis of the one or more signal characteristics and the position information.

30. The method of claim 24 wherein the location of the portable device is determined with respect to a vehicle, and wherein the determining the location includes determining an algorithmic process based on an operating mode, wherein determining the algorithmic process includes selecting at least one of a trilateration algorithm, a triangulation algorithm, a heuristic analysis, and a fingerprinting analysis, and wherein the operating mode is determined based on at least one of a) whether the portable device is determined to be outside or inside a first zone relative to the vehicle and b) whether the portable device is determined to be outside or inside a cabin of the vehicle.

31. The method of claim 24 comprising determining at least one of motion information and position information for the portable device based on first sensor output from one or more first sensors.

32. The method of claim 31 wherein the one or more first sensors includes at least one of an angular rate sensor, a magnetometer, an accelerometer, an ultrasonic speaker/microphone, and a Global Positioning System (GPS) receiver; and
comprising:
determining at least one of motion information and position information for the master device and/or the one or more fixed position devices based on second sensor output from one or more second sensors, wherein the one or more second sensors includes at least one of an angular rate sensor, a magnetometer, an accelerometer, an ultrasonic speaker/microphone, a GPS receiver, a speedometer, an odometer, and an operational state sensor that provides an output indicative of an operational state and/or a characteristic of an object to which the master device and the at least one fixed position device are affixed; and consolidating the at least one of motion information and position information for the portable device, the at least one of motion information and position information for the master device and/or the at least one fixed position device, and the determined location of the portable device via at least one of a Kalman filter, a particle filter, a heuristic analysis, and a fingerprinting technique.

33. The method of claim 24 wherein the wireless communication link and the auxiliary communication link are Bluetooth communication links.

\* \* \* \* \*